United States Patent [19]

Chen et al.

[11] Patent Number: 5,504,674

[45] Date of Patent: * Apr. 2, 1996

[54] INSURANCE CLAIMS ESTIMATE, TEXT, AND GRAPHICS NETWORK AND METHOD

[75] Inventors: Jeff P. Chen, Hacienda Heights; David C. Wong, Glendora, both of Calif.

[73] Assignee: CCC Information Services, Inc., Chicago, Ill.

[*] Notice: The portion of the term of this patent subsequent to Jul. 11, 2012, has been disclaimed.

[21] Appl. No.: 63,790

[22] Filed: May 19, 1993

Related U.S. Application Data

[63] Continuation-in-part of Ser. No. 657,130, Feb. 19, 1991, abandoned.

[51] Int. Cl.⁶ ............................... G06F 17/60; G06F 3/14
[52] U.S. Cl. ...................... 364/401; 395/161; 395/153; 395/147; 395/156
[58] Field of Search .................................. 395/161, 147, 395/156, 153, 160, 200, 200.03, 200.04, 200.09; 364/401, 403, 424.03; 434/374

[56] References Cited

U.S. PATENT DOCUMENTS

| | | | |
|---|---|---|---|
| 3,829,844 | 8/1974 | Zonneveld et al. | 395/155 |
| 3,974,482 | 8/1976 | Balashov et al. | 395/375 |
| 4,060,915 | 12/1977 | Conway | 434/307 R |
| 4,404,639 | 9/1983 | McGuire et al. | 364/424.04 |
| 4,413,314 | 11/1983 | Slater et al. | 364/188 |
| 4,420,234 | 12/1983 | Dolejsi et al. | 353/122 |
| 4,435,769 | 3/1984 | Nagano et al. | 364/464.01 |
| 4,468,755 | 8/1984 | Iida | 395/600 |
| 4,520,399 | 5/1985 | Iida | 358/451 |
| 4,538,183 | 8/1985 | Kanno et al. | 358/452 |
| 4,558,374 | 12/1985 | Kurata et al. | 358/453 |
| 4,667,248 | 5/1987 | Kanno | 358/452 |
| 4,691,238 | 9/1987 | Yamada | 358/450 |
| 4,725,892 | 2/1988 | Suzuki et al. | 358/451 |
| 4,752,908 | 6/1988 | Bouillot | 395/144 |
| 4,774,569 | 9/1988 | Morton et al. | 348/107 |
| 4,837,635 | 6/1989 | Santos | 358/401 |
| 4,891,702 | 1/1990 | Nakayama et al. | 348/581 |
| 4,893,258 | 1/1990 | Sakuragi | 395/139 |
| 4,899,292 | 2/1990 | Montagna et al. | 395/147 |
| 4,972,318 | 11/1990 | Brown et al. | 364/403 |
| 4,992,940 | 2/1991 | Dworkin | 364/401 |
| 5,128,859 | 7/1992 | Carbone et al. | 364/401 |
| 5,146,404 | 9/1992 | Calloway et al. | 364/401 |
| 5,283,865 | 2/1994 | Johnson | 395/161 |
| 5,293,309 | 3/1994 | Sakai et al. | 364/401 |
| 5,317,503 | 5/1994 | Inoue | 364/401 X |
| 5,377,098 | 12/1994 | Sakai | 364/401 X |

Primary Examiner—Raymond J. Bayerl
Attorney, Agent, or Firm—Willian Brinks Hofer Gilson & Lione

[57] ABSTRACT

A communications network for processing insurance claims of objects. The communications network including claim terminals and repair terminals, each having a processor, a display monitor, and a mass storage device, for inputting and sending object-identification data, parts graphics images, and images from the claims terminals to the repair terminals through a communications channel. The repair terminals compute repair and replacement estimates and send the estimates to the claim terminal. The object-identification data include information stored in digital form for a multiplicity of objects. The sum of the costs for repairing an object or a part of an object versus the cost for replacing the object or the part of a object is compared. An imaging device may be used for capturing an electronic image in digital form of the damaged object. The display monitor displays the electronic image along with lists of parts of the damaged object, a parts description, or with a selected first part and a parts graphics image. A method for processing insurance claims of objects is also provided.

64 Claims, 23 Drawing Sheets

TO FIG. 2B

| CLAIMANT/INSURED | INSURANCE COMPANY | BODY SHOP |
|---|---|---|
| HAS LOSS. CALLS INSURANCE COMPANY. | SUGGESTS DRP SHOP. INFORMS INSURED OF CAR RENTAL OPTIONS. | DOES COMPUTERIZED ESTIMATE. TAKES ELECTRONIC IMAGES. KEEPS ESTIMATE AND IMAGES ON LOCAL STORAGE OR SENDS TO LIBRARY. REVIEWS ESTIMATE WITH INSURED. RECEIVED REPAIR AUTHORIZATION. CREATES COMPUTER EOR. E-MAILS EOR AND IMAGES TO INSURANCE COMPANY. |
| | RECEIVES E-MAIL OF EOR AND IMAGES. PREPARES WORK ORDER. E-MAILS BODY SHOP AUTHORIZATION/WORK ORDER NUMBER. | SCHEDULES REPAIR WORK OR MAY KEEP CAR. |
| SIGNS WORK ORDER. SCHEDULES REPAIR WORK OR LEAVES CAR AT BODY SHOP. | | |
| OBTAINS RENTAL CAR. | | SEARCHES FOR LKQ, NEW, AND A/M PARTS. RECEIVES ALL PARTS. CONFIRMS SCHEDULED REPAIRS. REPAIRS CAR. |

Fig. 10

| CLAIMANT/INSURED | INSURANCE COMPANY | APPRAISER | BODY SHOP |
|---|---|---|---|
| HAS LOSS. CALLS INSURANCE COMPANY. | SUGGESTS DRIVE-IN ESTIMATE LOCATION. | | INSURED DRIVES IN AND REQUESTS ESTIMATE. PERFORMS COMPUTERIZED ESTIMATE. TAKES ELECTRONIC IMAGES, KEEPS ESTIMATE AND IMAGES ON LOCAL STORAGE OR SENDS TO LIBRARY. INFORMS INSURED OF CAR RENTAL OPTIONS. RECEIVES REPAIR AUTHORIZATION. CONFIRMS COVERAGE. SCHEDULES REPAIR WORK OR MAY RECEIVE CAR. |
| TAKES CAR TO BODY SHOP. | | PERFORMS COMPUTERIZED ESTIMATE. TAKES ELECTRONIC IMAGES KEEPS ESTIMATE AND IMAGES ON LOCAL STORAGE OR SENDS TO LIBRARY. INFORMS INSURED OF CAR RENTAL OPTIONS. GIVES INSURED CHECK FOR ESTIMATED REPAIRS. | |
| DETERMINES WHERE/WHEN TO GET CAR REPAIRED. | | | |
| SCHEDULES REPAIR DATE. SIGNS REPAIR ORDER. | | E-MAILS ESTIMATE TO BODY SHOP. RECEIVES REVIEWS ESTIMATE. | E-MAILS ESTIMATE TO APPRAISER. RECEIVES ESTIMATE. REVIEWS ESTIMATES. |
| | | | IF BODY SHOP DETERMINES REPAIRS EXCEED APPRAISER'S ESTIMATE, BODY SHOP PERFORMS OWN COMPUTERIZED ESTIMATE, TAKES ELECTRONIC IMAGES, AND CONTACTS APPRAISER. SUPPLEMENTS ESTIMATE. SEARCHES FOR PARTS. RECEIVES ALLS PARTS, CONFIRMS SCHEDULED REPAIRS. REPAIRS CARS. |
| OBTAINS RENTAL CAR. | | | |

Fig. 11

| CLAIMANT/INSURED | INSURANCE COMPANY | AUDITOR | BODY SHOP |
|---|---|---|---|
| HAS LOSS. CALLS INSURANCE COMPANY. HAS CAR TOWED TO LOT/IMPOUND YARD. | SUGGESTS TO INSURED TO MOVE CAR TO DRP. INFORMS INSURED OF CAR RENTAL OPTIONS. | | CALLED BY INSURED OR INSURANCE COMPANY TO TOW CAR FROM TOW LOT/IMPOUND YARD. DOES COMPUTERIZED ESTIMATE. TAKES ELECTRONIC IMAGES. KEEPS ESTIMATE AND IMAGES ON LOCAL STORAGE OR SENDS TO LIBRARY. REVIEWS REPAIR ESTIMATE WITH INSURED. IF CAR IS A TOTAL LOSS, PERFORMS TOTAL LOSS SCENARIO. RECEIVES REPAIR AUTHORIZATION AND TEAR-DOWN AUTHORIZATION. CREATES COMPUTER EOR. E-MAILS EOR AND IMAGES TO INSURANCE COMPANY. |
| OBTAINS RENTAL CAR. | | | |
| AUTHORIZES CAR REPAIR. | RECEIVED E-MAIL OF EOR AND ELECTRONIC IMAGES. PREPARES WORK ORDER. SENDS BODY SHOP AUTHORIZATION/WORK ORDER NUMBER. | ELECTRONICALLY AUDITS OF ELECTRONIC IMAGES AND ESTIMATE. | SCHEDULES REPAIR WORK. SEARCHES FOR PARTS. REPAIRS CAR. |

Fig. 12

APPRAISER

RECEIVES E-MAIL IMAGES TO DETERMINE IF LKQ PARTS SHOULD BE USED.

BODY SHOP

REVIEWS COMPUTER PARTS LIST. DETERMINES OTHER IMAGES ARE NEEDED TO GET CORRECT PARTS. TAKES ELECTRONIC IMAGES AND IMAGE PLATE.
E-MAILS PARTS LIST, IMAGES, AND MESSAGE.

REVIEWS DISMANTLER'S PARTS IMAGES.
DETERMINES WHICH PARTS TO ORDER.
E-MAILS ORDER.
RECEIVES DELIVERY OF PARTS. INSPECTS DAMAGE, CORRECTNESS, AND COMPLETENESS.

E-MAILS TO DISMANTLER TO RE-SHIP ANY ALTERNATE PARTS. ARRANGES TO RETURN ANY DAMAGED PARTS.

CONTINUES CONTACT WITH DISMANTLER UNTIL RECEIVE ALL LKQ PARTS.

CONTINUES WITH REPAIRS. IF DECIDES TO GET NEW PARTS, SEARCHES FOR A/M PARTS.

DISMANTLER

RECEIVES E-MAIL. REVIEWS INVENTORY. COMPARES PARTS TO IMAGES. DETERMINES WHICH PARTS ARE POSSIBLE MATCHES.
TAKES ELECTRONIC IMAGES.
E-MAILS IMAGES TO BODY SHOP.

MAY INITIATE OWN SEARCH FOR UNAVAILABLE PARTS. UPDATES E-MAIL MESSAGE AND FORWARDS IMAGES AND MESSAGE TO OTHER CONTACTS.
PULLS REQUESTED PARTS AND PREPARES PARTS ORDER. ARRANGES DELIVERY OF PARS TO BODY SHOP.

Fig. 17

| BODY SHOP | PARTS DEALER OR DISTRIBUTOR |
|---|---|
| REVIEWS COMPUTERIZED PARTS LIST.<br>DETERMINES OTHER IMAGES ARE NEEDED TO GET CORRECT PARTS.<br>TAKES ELECTRONIC IMAGES AND IMAGES OF PARTS PLATE.<br>E-MAILS PARTS LIST, IMAGES, AND MESSAGE. | RECEIVES E-MAIL.<br>REVIEWS INVENTORY.<br>COMPARES PARS TO IMAGES.<br>DETERMINES WHICH PARTS TO SHIP. |
| | IF PARTS UNAVAILABLE, UPDATES E-MAIL MESSAGE AND FORWARDS IMAGES AND MESSAGE TO LOCAL CONTACTS OR THROUGH DEALER NETWORK TO GET PARTS. |
| | PULLS AVAILABLE PARTS AND PREPARES PARTS ORDER. |
| | ARRANGES DELIVERY. |
| RECEIVES DELIVERY OF PARTS.<br>INSPECTS FOR DAMAGE, CORRECTNESS, AND COMPLETENESS. | |
| E-MAILS DEALER TO RE-SHIP ANY ALTERNATE PARTS.<br>ARRANGES TO RETURN ANY DAMAGED PARTS.<br>CONTINUES TO CONTACT DEALER UNTIL BODY SHOP RECEIVES UNDAMAGED PARTS. | |
| CONTINUES WITH REPAIRS. | |

| CLAIMANT/INSURED | INSURANCE COMPANY | BODY SHOP | |
|---|---|---|---|
| | | BODY SHOP IS NEVER AUTHORIZED TO BEGIN REPAIRS. | |
| | | TAKES ELECTRONIC IMAGES. | BEFORE REPAIRS |
| | | ATTEMPTS TO LIEN SELL CAR. E-MAILS IMAGES AND CAR INFORMATION ACCORDINGLY (SALVAGE YARDS, OTHER BODY SHOPS, ETC.) | |
| | | CONTACTS SALVAGE YARD. | |
| | | PERFORMS TOTAL LOSS SCENARIO. | |
| | | COMPLETES AUTHORIZED REPAIRS. NOTIFIES INSURED. | |
| | | TAKES ELECTRONIC IMAGES. E-MAILS IMAGES AND VEHICLE INFORMATION TO BODY SHOPS, SALVAGE YARDS, AND INSURANCE COMPANY. | AFTER REPAIRS |
| DOES NOT PICK UP REPAIRED CAR. | ATTEMPTS TO LIEN SELL CAR. | ATTEMPTS TO LIEN SELL CAR. | |
| | | CONTINUES WITH TOTAL LOSS SCENARIO. | |

INSURANCE CLAIMS ESTIMATE, TEXT, AND GRAPHICS NETWORK AND METHOD

This patent issued from a continuation-in-part patent application, of patent application entitled AUTO REPAIR ESTIMATE, TEXT AND GRAPHICS SYSTEM, by inventor David C. Wong having Ser. No. 07/657,130 and filing date Feb. 19, 1991, abandoned.

BACKGROUND OF THE INVENTION

This invention relates to a computer system for analyzing a insurance claims and determining an appropriate cost for repairing or replacing damaged objects, and more particularly to a computer system which can compare an electronic image of the damaged object with parts graphics image and costs of parts to be repaired or replaced.

DESCRIPTION OF THE RELEVANT ART

In the prior art, when estimating a cost for repairing a damaged object, such as a personal injury, a vehicle, or a building structure, insurance companies typically have an adjuster inspect the damaged object, and, based on the adjuster's experience, estimate the cost to repair or replace the damaged object. This process uses assumptions made by the adjuster. During this process, the adjuster, intentionally or unintentionally, may not make a comparison of the cost to repair a particular part versus the cost to replace that part. For example, in damaged vehicles, the cost to replace a part may be less than the cost to repair one or more parts which are included in, for example, a panel. An adjuster also may not account for overlapping costs such as the cost for painting a rear panel and a rear fender.

An adjuster usually takes one or more pictures of the damaged object as a record, and submits the photographs with a damage estimating sheet to an insurance company. To date, no apparatus integrates the insurance estimating functions including photographing the damaged object, comparing the cost of parts of the damaged objects with the cost of all the parts to be replaced, and overlapping the costs such as painting, etc.

In computerized text and graphics image systems, text typically is stored in digital form and graphics images may be stored in compressed digital form or in non-compressed digital form. In non-compressed digital form, data are individually stored defining each pixel of a graphics image. Data stored in non-compressed digital form allows rapid display of the graphics image, but also requires a relatively large memory to store the data because each image has thousands of pixels. In a compressed storage environment, by selecting a particular text and a set of graphics images for display, the computer system decompresses the selected graphics image stored in compressed digital form.

As defined in U.S. Pat. No. 4,899,292 to Montagna et al., text for a particular section of a document, such as a procedure for repairing one defective part of an automobile, may be grouped together in a single, long "hyperpage". At locations in the text which correspond to associated graphics images and data tables, reference numerals are entered in the text stream for indexing the corresponding graphics images and data tables.

A block of information in Montagna et al. defines each graphics image. Each block of information is compressed and stored in digital form. Similarly, a block of information defining a data table also may be stored. The reference numerals indicate the locations in computer memory where the corresponding blocks of information having the graphics image are stored. The text and associated graphics image, data tables and software routines are linked to each other by the reference numerals.

For example, if one hyperpage of text relates to a particular automobile repair procedure, then the text may be linked to the graphics image diagrams of the portion of the automobile having the part to be replaced and the surrounding parts which provide access to the defective part. The data table may provide the manufacturer part number of the defective part, and the software may inform the user that if the manufacturer repairs or replaces the part such as a lower ball joint, then the manufacturer must also perform a related service such as a front wheel alignment.

By selecting a first document, which includes text and a multiplicity of graphics images, the computer system decompresses the multiplicity of graphics image associated with the first document. The document includes reference numerals which identify associated graphics images so that when the document is selected, the system can determine which graphics image should be decompressed. All the graphics image data associated with the selected document are decompressed for near instantaneous display.

The computer system then displays, simultaneously, text and at least a first of the decompressed graphics images on a display screen. A user can subsequently command and display a second of the decompressed graphics images on the display screen. Because the second graphics image, which is associated with the first document, was decompressed with the first graphics image, no delay is encountered for displaying the second graphics image. The second graphics image may be selected by a touch screen overlaying the video display.

Any one of the decompressed graphics images can be enlarged and centered about a point on the screen which is touched or selected. The portion of the graphics image to be enlarged is processed for the enlargement after all of the graphics images associated with a document have been decompressed and displayed on the screen, and after the portion of the graphics image to be enlarged has been selected for enlargement and display.

For example, for vehicular damage in a service manual application for automobile repair and cost estimation, the computer system displays a graphics image of a vehicle or other objects, along with text describing steps for repairing or replacing a part. In an insurance estimation function, data include the names of models of vehicles or other objects under repair, potential repair operations to be performed and related time estimates, parts lists and costs, and the graphics image include different views of the vehicle or other object being repaired. By means of a touch screen, a particular part can be identified.

SUMMARY OF THE INVENTION

A general object of the invention is to provide an apparatus and method which integrate estimating insurance claims, providing insurance claim procedures, displaying text and displaying graphics image.

Another additional object of the invention is an apparatus and method which can document, record, and transmit a photograph of a damaged object and which can display the photograph while displaying and comparing damaged parts of the damaged object.

A further object of the invention is a communication network and method which enables an adjuster to communicate with parts suppliers and data bases to obtain initial estimates and supplemental estimates for repairing and replacing parts to a damaged object, a completed object, or a partially completed object.

According to the present invention, as embodied and broadly described herein, a communications network and communications method are provided including a computer system having a processor, a display monitor and memory means for storing digital data. The communications network and communications method encompass hardware, firmware and/or software specifically designed to perform the method or functions of the present invention with the processor, display monitor and memory means. The digital data include information stored in digital form for a multiplicity of objects, a database of a plurality of groups of parts, a plurality of associated parts graphics image, and a plurality of costs for replacing the parts, for replacing groups of parts, and for listing alternative parts. For each object, the database has a graphics library, including parts illustrations for all of the parts of a given object; for example, for automobiles, the parts illustrations may include fenders, hood, doors, etc, as well as all body style variation of a given car, i.e. coupe, sedan, and convertible. Such parts illustrations and style variations typically are stored in the graphics libraries in compressed digital form.

The communications network and method comprise means for inputting identification data, or an object-identification number, of a damaged object to the processor; first means; and second means. The communications network and method may decode the identification data or the object-identification number for identifying and displaying corresponding objects and parts of objects. First means displays, on the display monitor, a list of groups of parts for the damaged object. Second means displays, on the display monitor, a parts description from the data base of the first group of parts. The invention is taught, by way of example, for replacing a first part and a second part from a first group of parts, and a third part and a fourth part from a second group of parts. The present invention is by no means limited to first part, second part, third part or fourth part.

Graphics means retrieves from the memory means a first parts graphics image, which may be stored in compressed or non-0compressed digital form, and associated with the first part, and loads the first parts graphics image into a first memory buffer in response to selecting a first part from the parts description. During the retrieving step, if the first parts graphics image is stored in compressed digital form, then the first parts graphics image is decompressed. Third means displays, on the display monitor, the first parts graphics image.

Cost means retrieves from the memory means a first cost for replacing the first part in response to selecting a first part from the parts description. In response to selecting a second part from the parts description of the first group, cost means retrieves from the memory means a second cost for replacing the second part. Graphics means may retrieve from the memory means a second parts graphics image associated with the second part, and load the second parts graphics image into the first memory buffer. The second parts graphics image is decompressed if the second parts graphics image is stored in compressed digital form. Third means displays, on the display monitor, the second parts graphics image. The cost means retrieves from the memory means a first replacement cost of the first group and compares the first replacement cost with a sum of the first cost and the second cost of the first part and the second part, respectively. The cost means accordingly determines which of the first replacement cost and the sum have a first lower cost.

The present invention also includes second means for displaying, on the display monitor, a parts description from the data base of the second group of parts in response to selecting a second group of parts from the list of groups of parts. Graphics means retrieves from the memory means a third parts graphics image, stored in digital form and associated with the third part, and loads the third parts graphics image into the first memory buffer in response to selecting a third part from the parts description. The third parts graphics image is decompressed if it is stored in compressed digital form. Third means displays, on the display monitor, the third parts graphics image in response to loading the third parts graphics image into the first memory buffer.

The second means also can display, on the display monitor, a parts description of the second group of parts in response to selecting a second group of parts from the list of groups of parts. The cost means retrieves from the memory means a third cost for replacing the third part in response to selecting a third part from the parts description of the second group. The cost means retrieves from the memory means a fourth cost for replacing the fourth part in response to selecting fourth part from the parts description of the second group. The cost means retrieves from the memory means a second replacement cost for the second group and compares the second replacement cost with a sum of the third cost and the fourth cost. The cost means, accordingly, determines which of the second replacement cost and the sum have a second lower cost. Overlap means determines any overlap cost and subtracts from a sum of the first lower cost and the second lower cost the overlap cost to produce a net cost. Third means displays, on the display monitor, the net cost. The cost means may store various calculations stored in an electronic file in the memory, and the cost means may include audit means for auditing a specific insurance claim or group of insurance claims.

The present invention also includes having graphics means generate, in digital form, a magnified graphics image from the parts graphics image and loading the magnified graphics image into a second memory buffer. In response to selecting the magnified graphics image for display, fourth means swaps the magnified graphics image with the parts graphics image on the display monitor.

The present invention also includes imaging means for capturing an electronic image in digital form of the damaged vehicle. Interface means is provided for transferring the electronic image from the imaging means through a data port to the memory means of the processor. The imaging means may include a videotape camera, a digital camera, a still camera, a video cassette recorder (VCR), or a digital imaging system. The display monitor may display, using an index to a folder system, the electronic image with the list of groups of parts for the damaged vehicle, with the parts description, or with the first part.

The present invention may also include an electronic folder index for indexing capture estimates, photographs, graphics images, administrative information, assignment data, etc.

The communications network and communications method communicate object information and repair estimates, using the computer system and method of the present invention as terminals, using radio communication channels, wireless communications techniques, telephone lines, etc. The communications network includes imaging means for capturing an electronic image in digital form of a damaged object; a claim terminal for sending assignment data, including individual or customer information, object information, damage information, and the electronic image; repair terminals which, in response to assignment data from the claim terminal, may send a cost estimate and a supplemental estimate to the claim terminal, for sending first parts information, parts order information, and parts graphics images; and interface means for transferring the electronic image from the imaging means through the data port to the memory means of the claim terminal. The claim terminal is employed to access insurance claims for objects; for example, automobile insurance claims.

Both the claim terminal and the repair terminal include the computer system of the present invention, and both the claim terminal and the repair terminal utilize the computer method of the present invention to input and display vehicle information and graphics images of parts. Both the claim terminal and the body shop terminal include a display, a data port, memory means for storing digital data for a multiplicity of objects in a data base of a plurality of groups of parts and a plurality of associated parts graphics images, means for inputting object-identification data of a damaged object to each respective claim terminal and repair terminal, first means for displaying on the display the electronic image and a list of groups of parts for the damaged object, and second means for displaying on the display the electronic image and a parts description from the data base of the first group of parts. Both the claim terminal and the repair terminal may include touch screens for inputting to and selecting data from the data base, and the claim terminal and repair terminal may be light weight for portability.

Each claim terminal and each repair terminal also includes graphics means for retrieving from the memory means a first parts graphics image stored in digital form and associated with the first part and for loading the first parts graphics image into a first memory buffer, with the graphics means generating, in digital form, a first magnified graphics image from the first parts graphics image, and with the graphics means loading the first magnified graphics image into a second memory buffer.

Both the claim terminal and the repair terminal also include third means for displaying on the display the electronic image and the first parts graphics image, and fourth means for swapping the first magnified graphics image from the second memory buffer with the first parts graphics image on the display, and displaying the electronic image with the first magnified graphics image.

The communications network also includes having the repair terminals sending parts order information to vendor terminals, with the vendor terminals sending to the repair terminals a corresponding acknowledgement signal. The communications network may further include having the repair terminals sending first parts information to salvage terminals with the salvage terminals sending information of used parts to the repair terminals.

The communications method of the present invention further includes using the communications network for sending the object-identification data from a claim terminal to a repair terminal, with the user at the repair terminal determining a lower cost for repair and replacement of parts for a damaged object and sending the lower cost as an estimate from the repair terminal to the claim terminal.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIGS. 10–19 show a flow diagram of the operation of the communications network of the present invention.

DETAILED DESCRIPTION OF THE PREFERRED EMBODIMENTS

Figure 1:
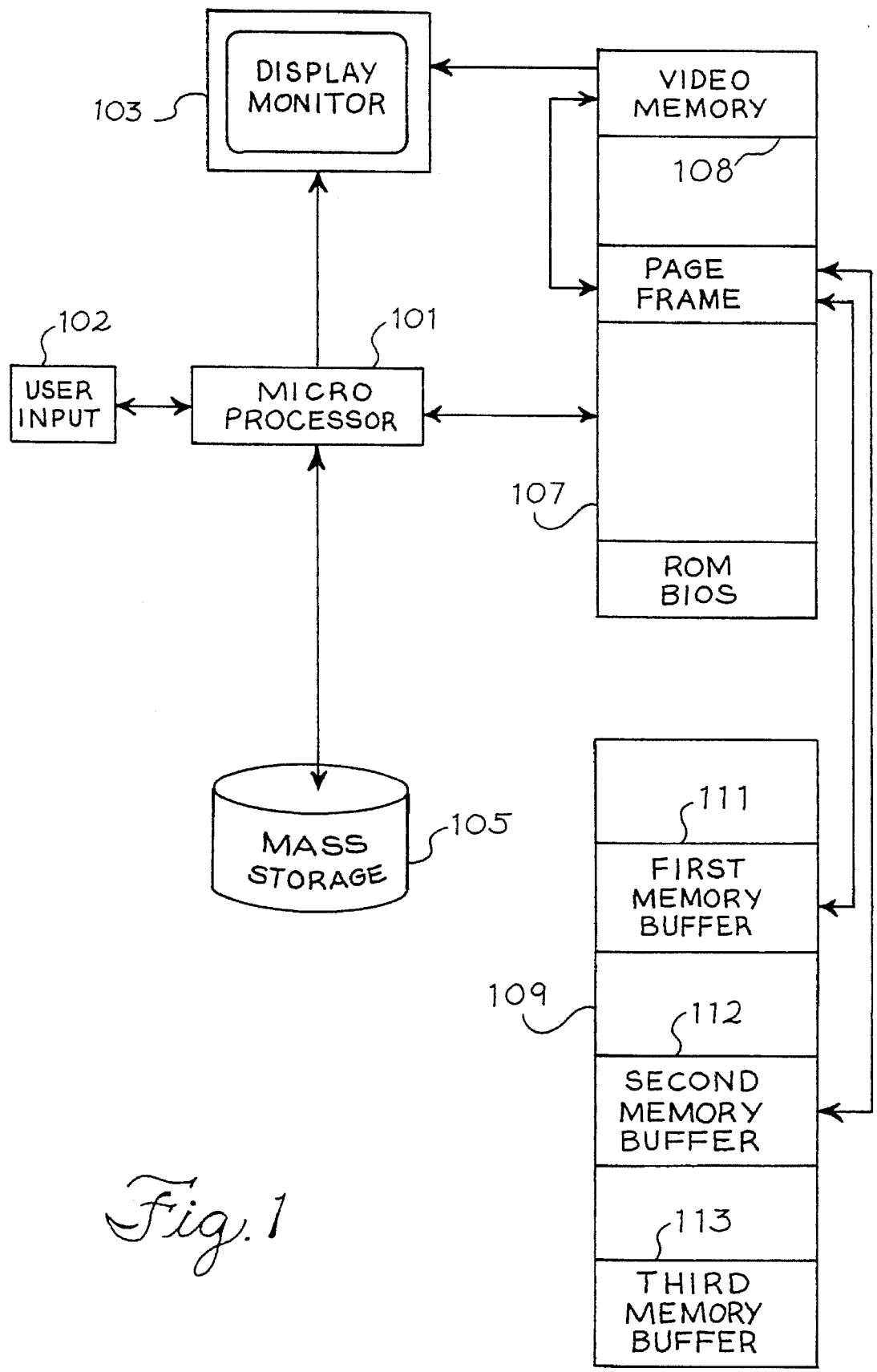
FIG. 1 shows a block diagram of the computer text and graphics image system of the present invention.

Reference now is made in detail to the present preferred embodiments of the invention, examples of which are illustrated in the accompanying drawings, wherein like reference numerals indicate like elements throughout the several views.

As illustratively shown in FIG. 1, the present invention includes a text and graphics image system using a computer. More specifically, the computer system comprises a processor 101, a display monitor 103, and memory means. The processor 101, monitor 103 and memory means may be embodied in a computer system which, by way of example, may be a personal computer using an INTEL 8086, 80286, 80386, or 80486 microprocessor. The memory means stores digital data.

The memory means may be embodied as a mass storage device 105, a main memory 107 and an expanded memory 109. The processor 101 is coupled to the mass storage device 105, monitor 103, and main memory 107. The main memory 107 is coupled to the expanded memory 109. The mass storage device 105 can be a hard disk, compact disk, optical disk or other computer storage device, and the mass storage device 105 may be used for archiving data. The main memory 107 can be embodied as random access memory (RAM), or equivalent. The expanded memory 109, which also may be RAM, or a hard disk, is used once the system detects insufficient available main memory 107. The expanded memory 109 includes a first memory buffer 111 and a second memory buffer 112. The first memory buffer 111 and the second memory buffer 112 may be embodied as virtual memory in a RAM.

The main memory 107 has a video memory 108 included therein, or external thereto, which stores in a display format information which is displayed on the display monitor 103. The information stored in the video memory 108 is used to refresh the display on the display monitor 103. The information may be text, a graphics image or a combination thereof. The mass storage device 105 stores a data base of text, and graphics images which may be in compressed digital form. The digital data stored in memory means include a data base, for a multiplicity of objects, of a plurality of groups of parts, a plurality of associated parts graphics image, and a plurality of costs for replacing the parts and for replacing groups of parts. The term cost, as used herein, means broadly any cost encountered for replacing parts and/or replacing groups of parts of the damaged objects. For example, in vehicular damage estimation, such costs may include parts costs, labor time, painting, etc. The data base may include, for example, the replacement parts, times, procedures and footnotes for automobiles. The compressed digital form may use PCX, TIFF or other graphics image formats.

The computer system also includes means for inputting object-identification data of a damaged object to the processor 101. The inputting means may be embodied as a user input 102, such as a keyboard working cooperatively with software.

The present invention may be embodied as an apparatus or method, and the following discussion incorporates both embodiments. Furthermore, the present invention comprises an apparatus or method for estimating insurance claims for damaged objects, with objects defined as an item or event involved in an insurance claim. Objects may include parts of a person's body or injuries or afflictions of a person's body, i.e. personal injuries; physical structures such as buildings; and automobiles and other vehicles. Damaged objects may include personal body injuries requiring simple or complex operations, transfusions, transplants, prosthetics, treatments, and the like; buildings having structural damage from fire, flooding, earthquakes, hurricanes, tornadoes, collisions from vehicles, and the like; or damaged vehicles having damages parts. The apparatus or method for estimating insurance claims to damaged objects may include estimates for total loss and replacement of the damaged or lost objects.

The following description of preferred embodiments describes, without loss of generality, the invention as applied to insurance claims for damaged vehicles as the damaged objects of the insurance claims. It is understood that the invention may include other damaged objects, i.e. structural damage to buildings or personal body injuries, as well as damaged vehicles; and terms of art of vehicular insurance claims and repair are understood to be analogous to corresponding terms of art of other objects, i.e. vehicles are repaired in body shops, while other damaged objects are repaired or treated in repair locations; for example, personal injuries are repairs or treated in hospitals and the like, while building structural damage is repaired at the building site. Similarly, vehicular repairs involve vehicular body parts from vendor shops or salvage shops, while personal injuries involve medical devices, treatment regimens, donated organs, and the like; and repairs to building structures involve building materials from materials suppliers.

Figure 2A:
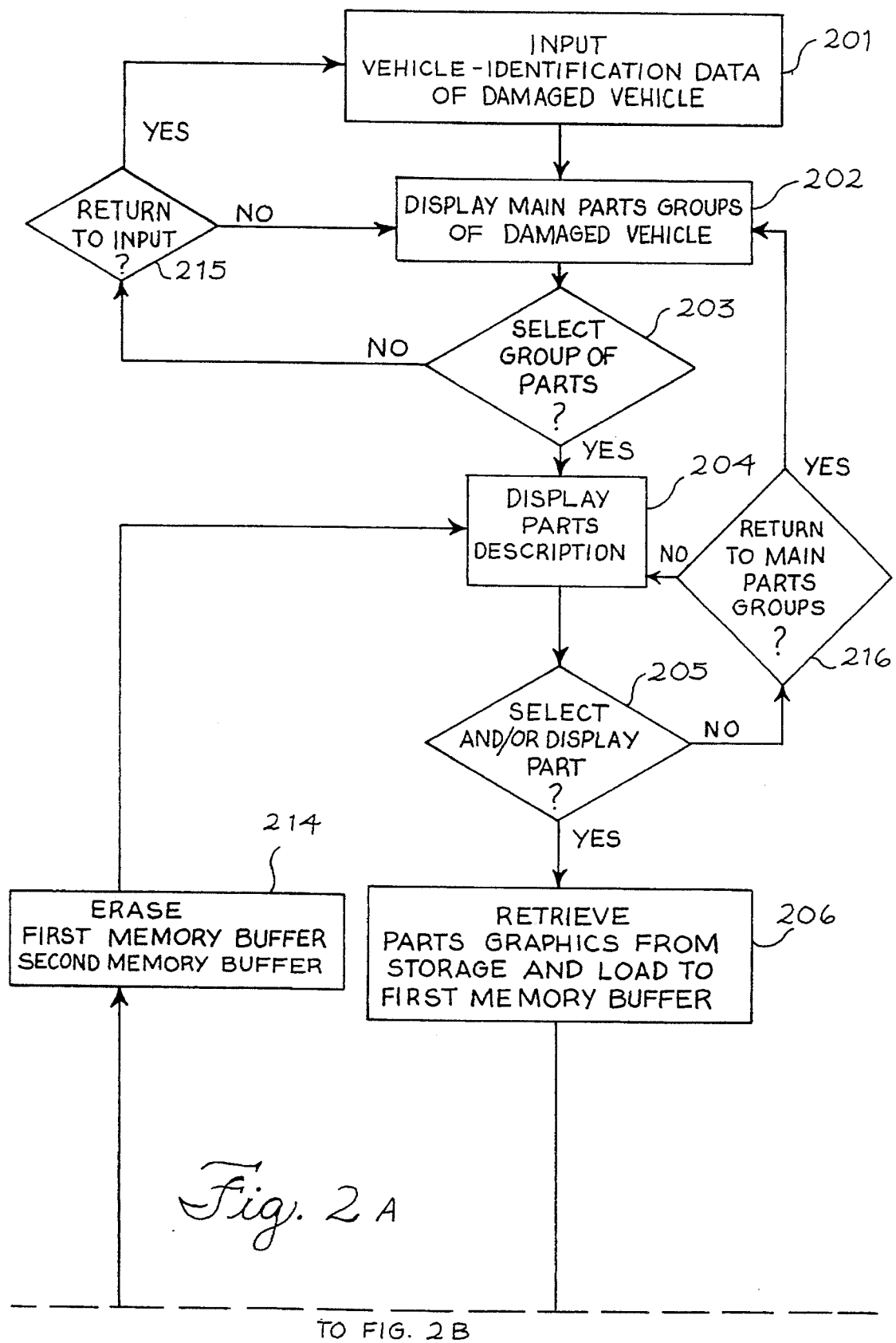
FIG. 2 is a flow chart of the graphics image generating function of the present invention.
Figure 2B:
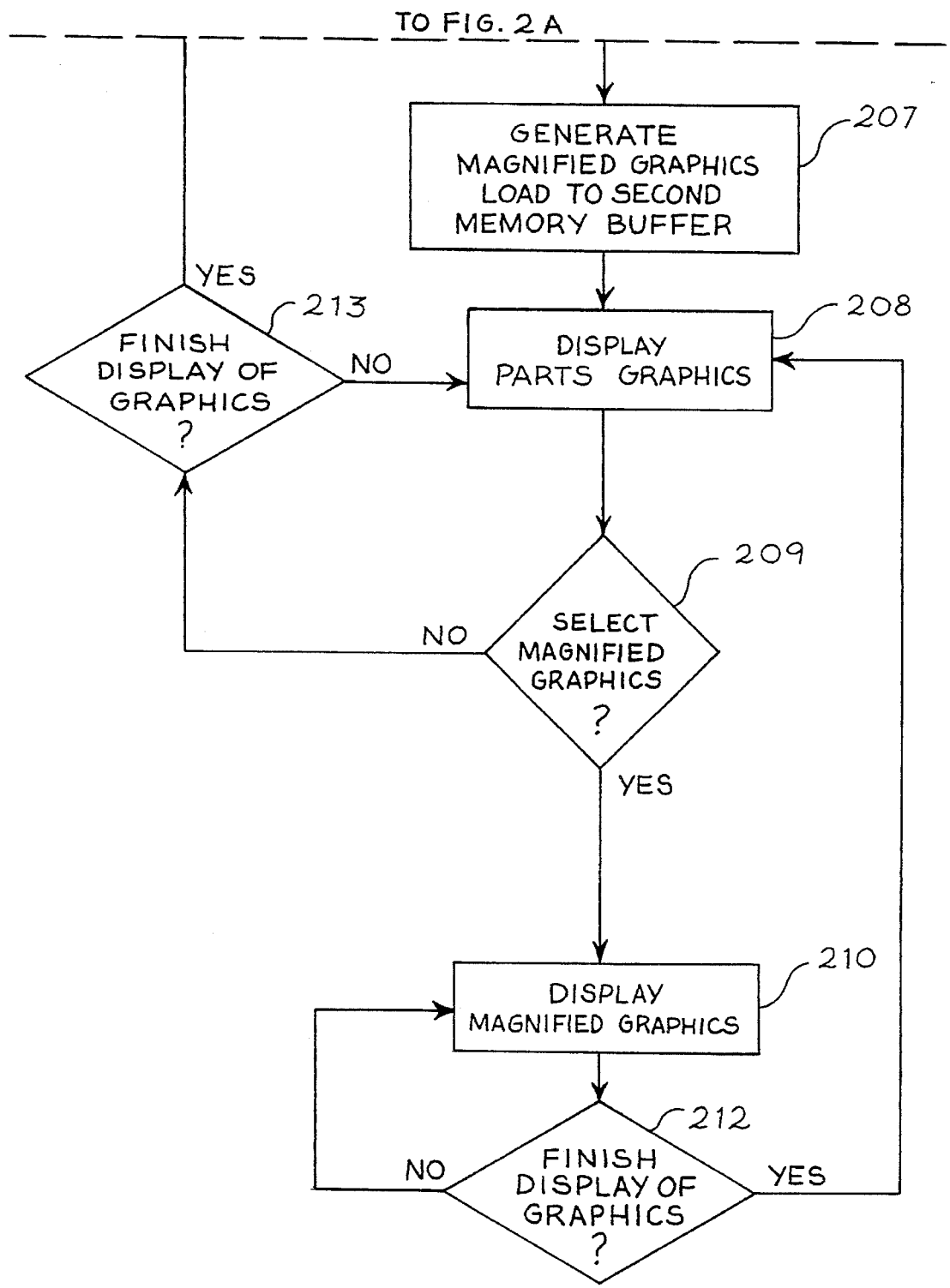

Referring to FIG. 2, a user inputs 201, using the user input 102 of FIG. 1, vehicle-identification data of the damaged vehicle. The vehicle-identification data optionally can be verified as valid, prior to proceeding with the method of the present invention. The vehicle serial number, model, year and other vehicle information may be incorporated into the validity check. First means displays 202, on the display monitor 103 of FIG. 1, a list of groups of parts for the damaged vehicle in response to receiving and/or verifying the vehicle-identification data in the computer system. The first means can be software or firmware in RAM or in a read-only-memory (ROM), operating with processor 101. The list of groups of parts might include, for example, main parts groups such as: front bumper; frame; grill and lamps; fender and lamps; engine, transmission and axle; wheels and front suspension; front door and rear door; steering; trunk lid; rear body and lamps; fuel systems; rear suspension; rear bumper; and interior trim. The list of groups of parts, the groups of parts and the parts are stored in a data base in mass storage device 105.

The user has the Option to select 203, using user input 102, a first group of parts from the list of groups of parts. Second means displays 204, on the display monitor 103, a parts description from the data base of the first group of parts from the list of groups of parts. By way of example, if the front bumper is selected as the first group, then the first group of parts might include: face bar; rubber strip; guard; extension; support; filler; molding; license bracket; and energy absorber. Second means may be software or firmware in RAM or ROM operating with processor 101.

The present invention illustratively is taught for a first part and a second part selected from a first group of parts, and a third part and a fourth part selected from a second group of parts. The present invention is not limited to only two parts from a group of parts or to only two groups of parts. Any number of parts can be selected for repair from a particular group of parts, and any number of groups of parts may be selected.

The user has the option to select 205, using user input 102, a first part from the parts description. Graphics means retrieves 206 from the mass storage device 105 of FIG. 1, a first parts graphics image, stored in digital form and associated with the first part, and loads the first parts graphics image into a first memory buffer 111 in response to selecting 205 the first part from the parts description. Graphics means subsequently generates 207 a first magnified graphics image from the first parts graphics image and loads the first magnified graphics image into a second memory buffer 112. After loading the first parts graphics image and first magnified graphics image into the first memory buffer 111 and second memory buffer 112, respectively, third means displays 208, on the display monitor 103, the first parts graphics image. Thus, if the face bar is selected from the first group of parts as the first part, then graphics means would retrieve as the first parts graphics image a graphical representation of the face bar and store the graphical representation of the face bar as the first parts graphics image in the first memory buffer 111. The graphical representation of the face bar also would be enlarged and stored as the first magnified graphics image in the second memory buffer 112. The graphical representation of the face bar stored in first memory buffer 111 is initially displayed on display monitor 103.

The user has the option, using user input 102, to select 209 the first magnified graphics image for display on display monitor 103. If the first magnified graphics image is selected, then the enlarged graphical representation of the face bar, for example, stored in second memory buffer 112 is displayed 210 on display monitor 103. The user has the option to finish 212, 213 displaying the graphical images. When the user is finished looking at a particular part, such as the face bar, then the first memory buffer 111 and second memory buffer 112 are erased 214.

Figure 3A:
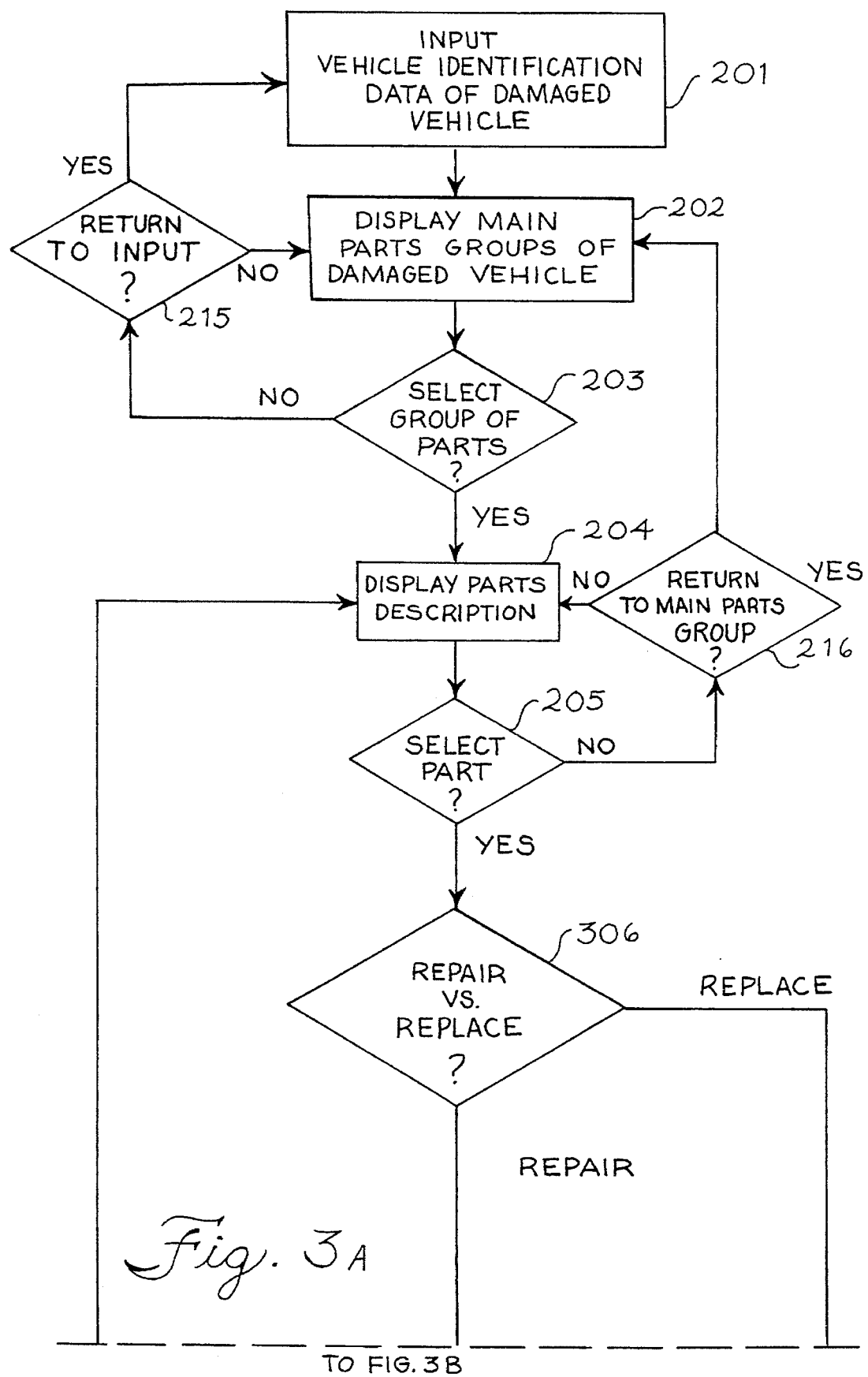
FIG. 3 is a flow chart of the cost estimating function of the present invention.
Figure 3B:
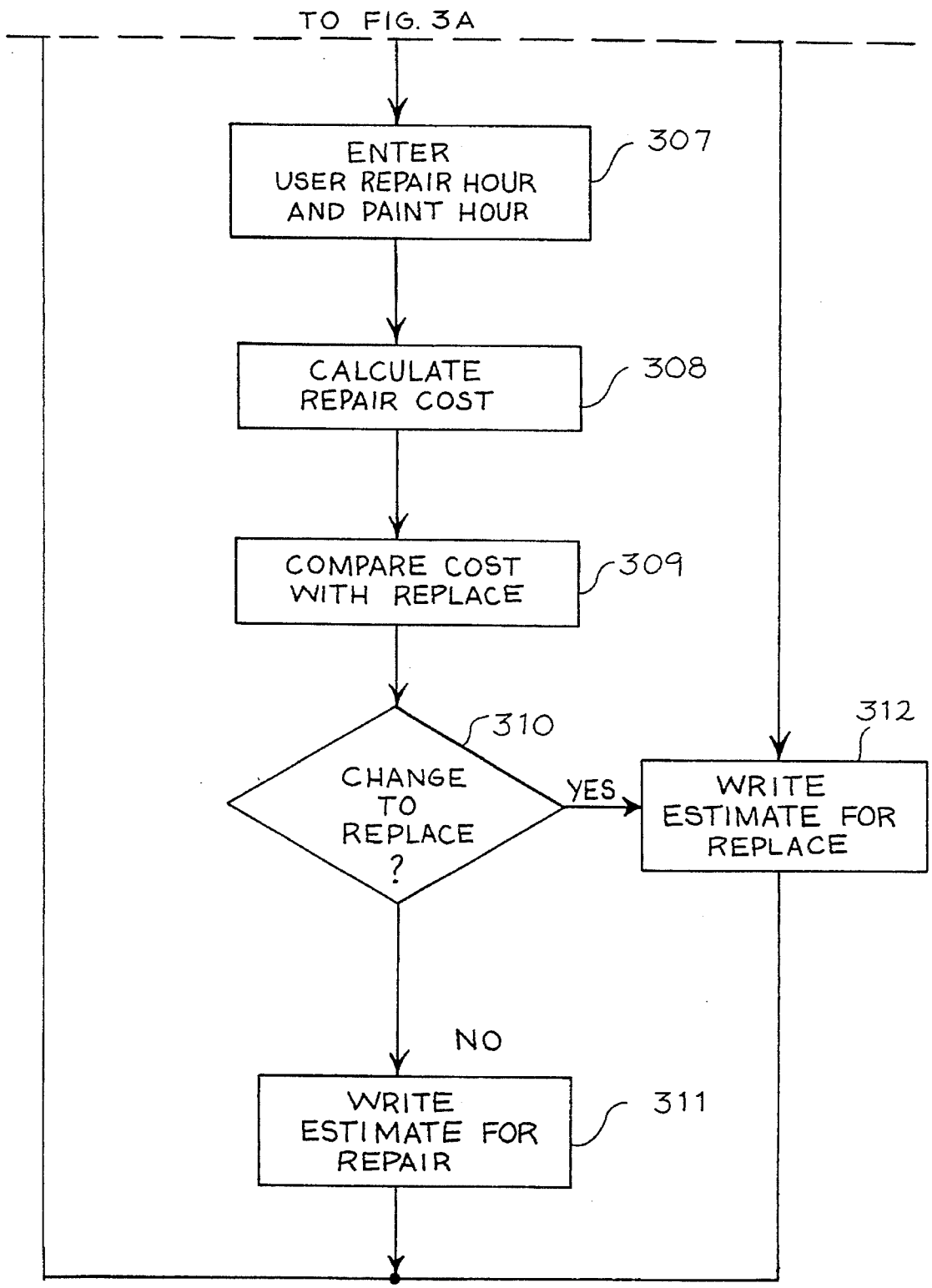

Referring to FIG. 3, a user has the option to select 306 using user input 102, Whether to replace a part or repair the part. The user can retrieve 307 a first cost for replacing a first part by selecting a first part from the parts description. A second part or any number of additional parts from the parts description of the first group may be selected 307. In response to selecting a second part from the parts description of the first group, cost means retrieves from the memory means a second cost for replacing the second part. Graphics means optionally may retrieve from the memory means a second parts graphics image associated with the second part, and load the second parts graphics image into the first memory buffer. Third means displays, on the display monitor 103, the second parts graphics image. Additional parts may be selected from the first group, as required.

The cost means calculates 308 the total cost to repair as a sum. The cost broadly includes a part cost to replace a part, labor hours to replace the part and paint hours to paint the part, if required. Thus, from the first group for the front bumper, the first part might be to replace a face bar with a part cost of $228.80, labor of 1.8 hours to replace, and no hours for paint. The second part might be to replace a rubber strip with a part cost of $18.45, labor of 0.3 hours to repair the face bar, and no hours for paint.

The cost means retrieves from the memory means a first replacement cost of the first group and compares 309 the first repair cost with a sum of the first cost and the second cost of the first part and the second part, respectively. The cost means accordingly allows the user to determine which of the first replacement cost and the sum have a first lower cost. The user has the option to select 310 the sum or cost to replace the panel and then write 311 an estimate for repairing or 312 for replacing the damaged vehicle.

Third means, graphics means and cost means may be software or firmware embedded in RAM working cooperatively with processor 101. The cost for repairing parts and the replacement cost for a group of parts are stored in a data base in mass storage device 105.

Referring to FIG. 3, the present invention also includes having second means display 204 on the display monitor 103, a parts description from the data base of a second group of parts in response to selecting 203 a second group of parts from the list of groups of parts. The second means displays, on the display monitor 103, a parts description of the second group of parts in response to selecting a second group of parts from the list of groups of parts. The second group of parts might be for the grill and lamps. The second group of parts for the grill and lamp might include: mount bracket; support bracket; aim headlamps; headlamp assembly; sealed beam; and retainer ring.

The user has the option to select 205, using user input 102, a third part from the second group of parts. Graphics means, as shown in FIG. 2, accordingly retrieves 206, from the mass storage device 105, a third parts graphics image, stored in digital form and associated with the third part, and loads 207 the third parts graphics image into a first buffer 111 in response to selecting 205 the third part from the parts description. Third means displays 208, on the display monitor 103, the third parts graphics image after loading the third parts graphics image into the first buffer 111.

The cost means may retrieve from the mass storage device 205 a third cost for replacing the third part in response to selecting 205 a third part from the parts description of the second group. The user has the option to select 205, using user input 102, a fourth part or any number of additional parts from the parts description of the second group. The cost means retrieves, from the mass storage device 105, a fourth cost for replacing the fourth part after selecting 205 a fourth part from the parts description of the second group. The third part, such as a right sealed beam inner standard, might have a cost of $16.45 and labor of 0.3 hours. A fourth part may be selected, such as to replace a right headlamp assembly, and displayed on the display monitor 103. The fourth part, such as to replace a right headlamp assembly, might have a cost of $42.13 and labor of 0.3 hours.

The cost means retrieves, from the mass storage device 105, a second replacement cost for the second group and compares 309 the second replacement cost with a sum of the third cost and the fourth cost. The replacement cost for overhauling the grill and lamps might be greater than the costs to replace third and fourth parts. The cost means, accordingly, allows a user to determine which of the second replacement cost and the sum have a second lower cost.

Overlap means determines any overlap cost and subtracts from a sum of the first lower cost and the second lower cost the overlap cost to produce net cost. The overlapping costs can come from parts, labor hours and/or painting hours. By way of example, assume the first group of parts is for the roof and back glass. From the first group, a roof panel with sunroof is selected as the first part, with a part cost of $657.00, labor of 18.5 hours and painting of 4.5 hours. The back glass also is selected from the first group, with a part cost of $156.00, labor of 1.8 hours and no painting hours. Since the labor for replacing the back glass is included with replacing the roof panel with a sunroof, the labor of 1.8 hours for replacing the back glass is subtracted out, i.e. included in the labor for replacing the roof panel. Similarly, reveal molding may be selected as a third part with a part cost of $12.45 and labor of 0.3 hours. The labor of 0.3 hours for replacing the reveal molding would be included in the labor of 18.5 hours for replacing the roof panel. Thus, the total cost for the first group is $825.45 for part cost, 18.5 hours labor, and 4.5 hours painting.

Assume the second group of parts is for replacing a right outer panel. The total cost of the second group is $304.00 part cost, 13.5 hours labor and 2.8 hours painting. Between the right outer panel, the second group, and the first group, the roof and back glass, when replacing parts from both groups, there are overlapping labor hours and painting hours. The overlapping labor hours might be 4.0 hours and painting hours might be 0.4 hours. Overlapping means determines these overlapping costs, and displays the overlapping costs on the display monitor 103. The overlapping costs are subtracted from the total costs to repair and/or replace parts and/or panels of the damaged vehicle. Third means displays, on the display monitor 103, the net cost.

Referring back to the illustrative flow chart in FIG. 2, the present invention also includes having graphics means generate 207, in digital form, a magnified graphics image from the parts graphics image and loading 20V the magnified graphics image into a second memory buffer 112. The user has an option to select 209 the magnified graphics image for display. In response to selecting 209 the magnified graphics image for display, fourth means swaps the magnified graphics image from the second memory 108 for display 210 on the display monitor 103. While displaying 210 the magnified graphics image, the user has the option to select 212 to continue displaying the magnified graphics image 210 or the parts graphics image 208. Accordingly, fourth means swaps the parts graphics image from the first virtual memory buffer 111 with the magnified graphics image for display 208 on the display monitor 103. The parts graphics image for example, might be a right headlamp assembly and the magnified graphics image might be an enlarged version of the right headlamp assembly. Fourth means may be embodied as software operating cooperatively with processor 101. When the user is finished 213 displaying parts graphics image and magnified graphics image, the processor 101 erases 214 first memory buffer 111 and second memory buffer 112.

Figure 4A:
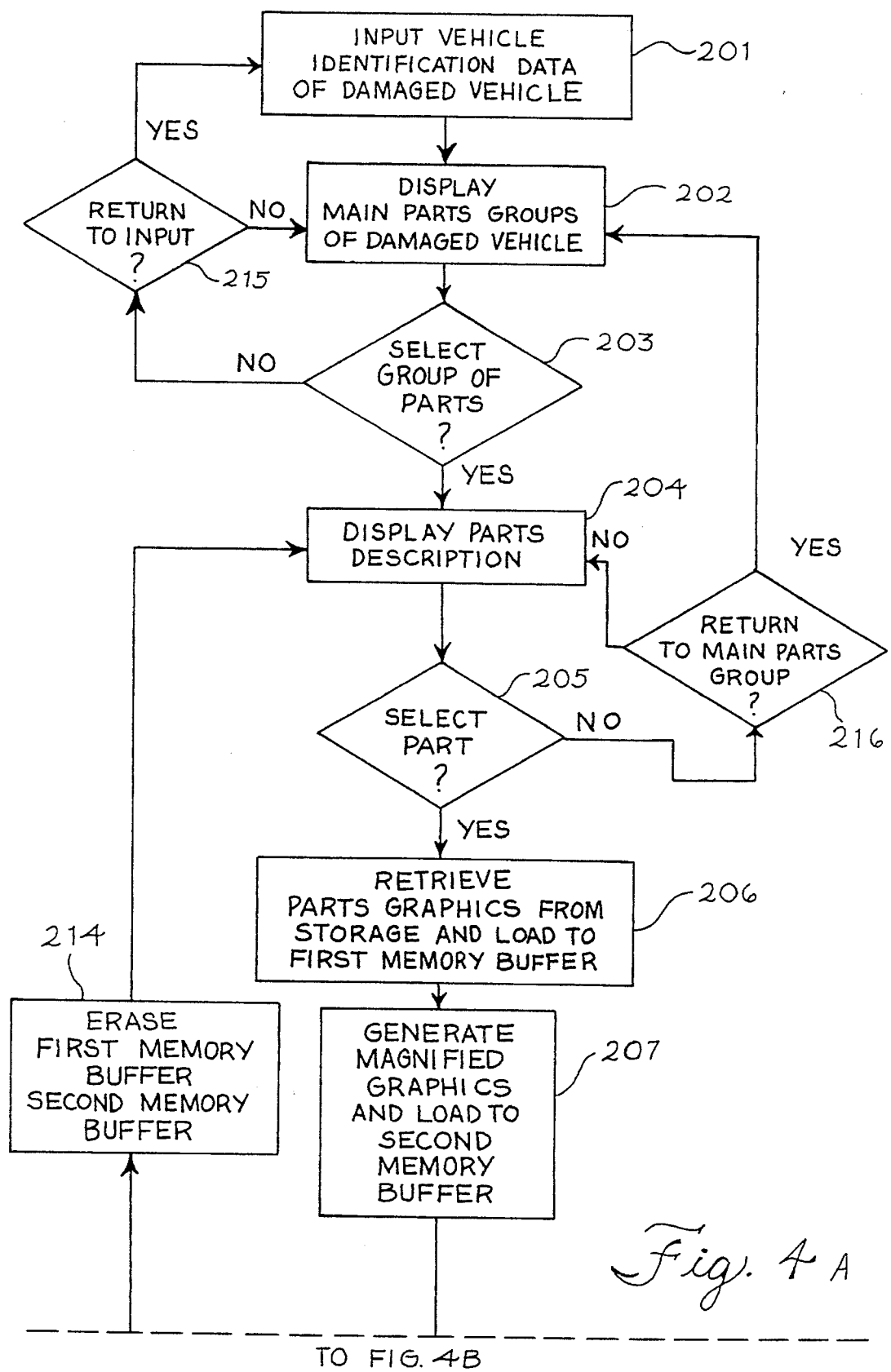
FIG. 4 is a flow chart of the graphics image generating function with a text window.
Figure 4B:
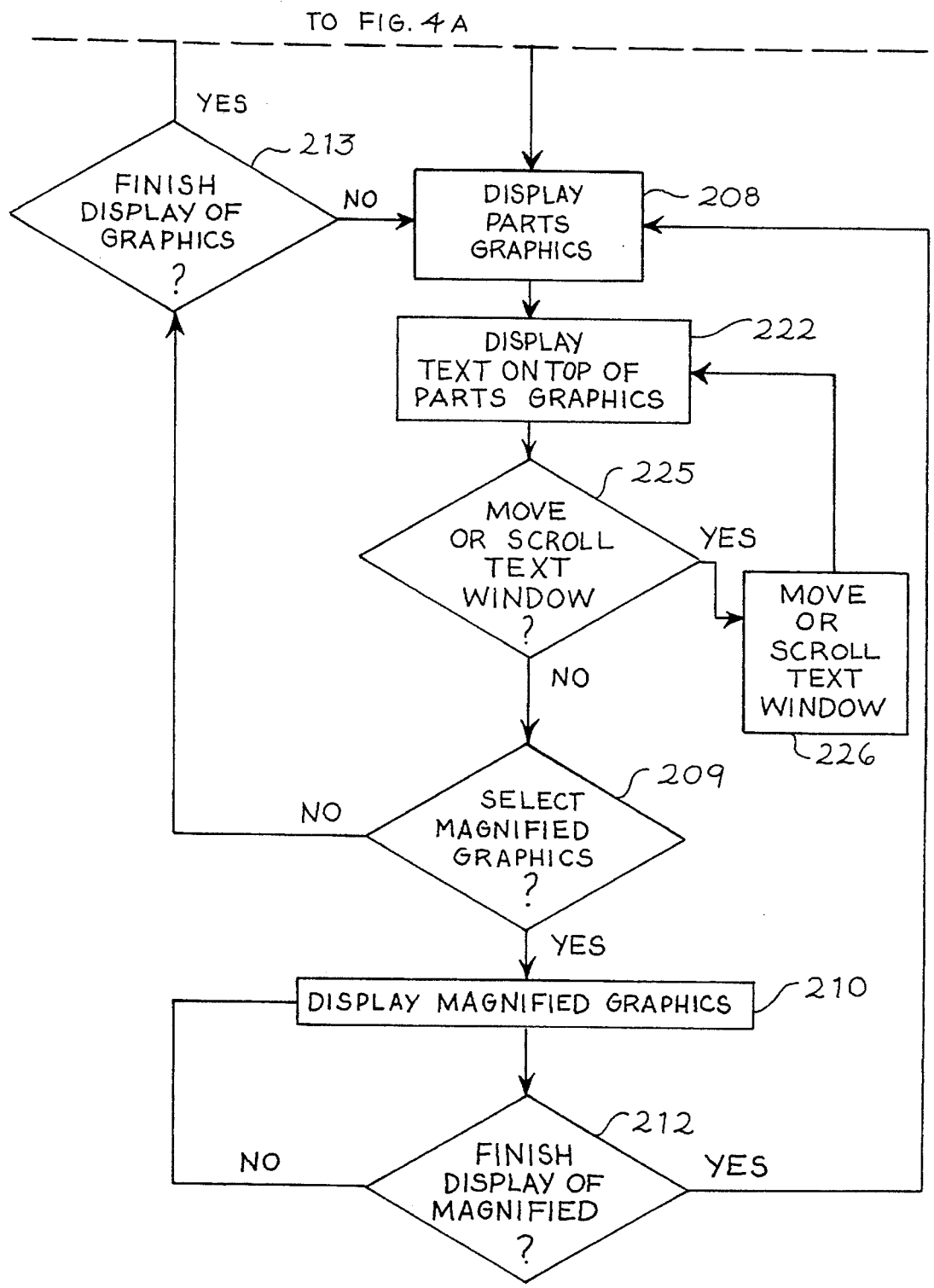

In the exemplary method shown in FIG. 4, the present invention further includes text means. In response to selecting 205 the first part from the parts description, text means retrieves, from the memory means, text information. The text information is stored in digital form and associated with the first part. The text means optionally displays 222 the text information in a text window on top of the parts graphics image, where displaying text information on top of the parts graphics image using a text window is defined herein to mean that the text window overlaps or is rewritten over the area of the parts graphics image, so that the text information and the text window is displayed and the overwritten part or all of the parts graphics image is no longer displayed.

The user has the option 225 to move or scroll 226, the text window. The text window is displayed at the same time as displaying the parts graphics image or the magnified graphics image. When the user is finished 213 displaying the parts graphics image or magnified graphics image, and is finished 213 displaying the text window, the processor 101 erases 214 the first memory buffer 111 and the second memory buffer 112.

Figure 5A:
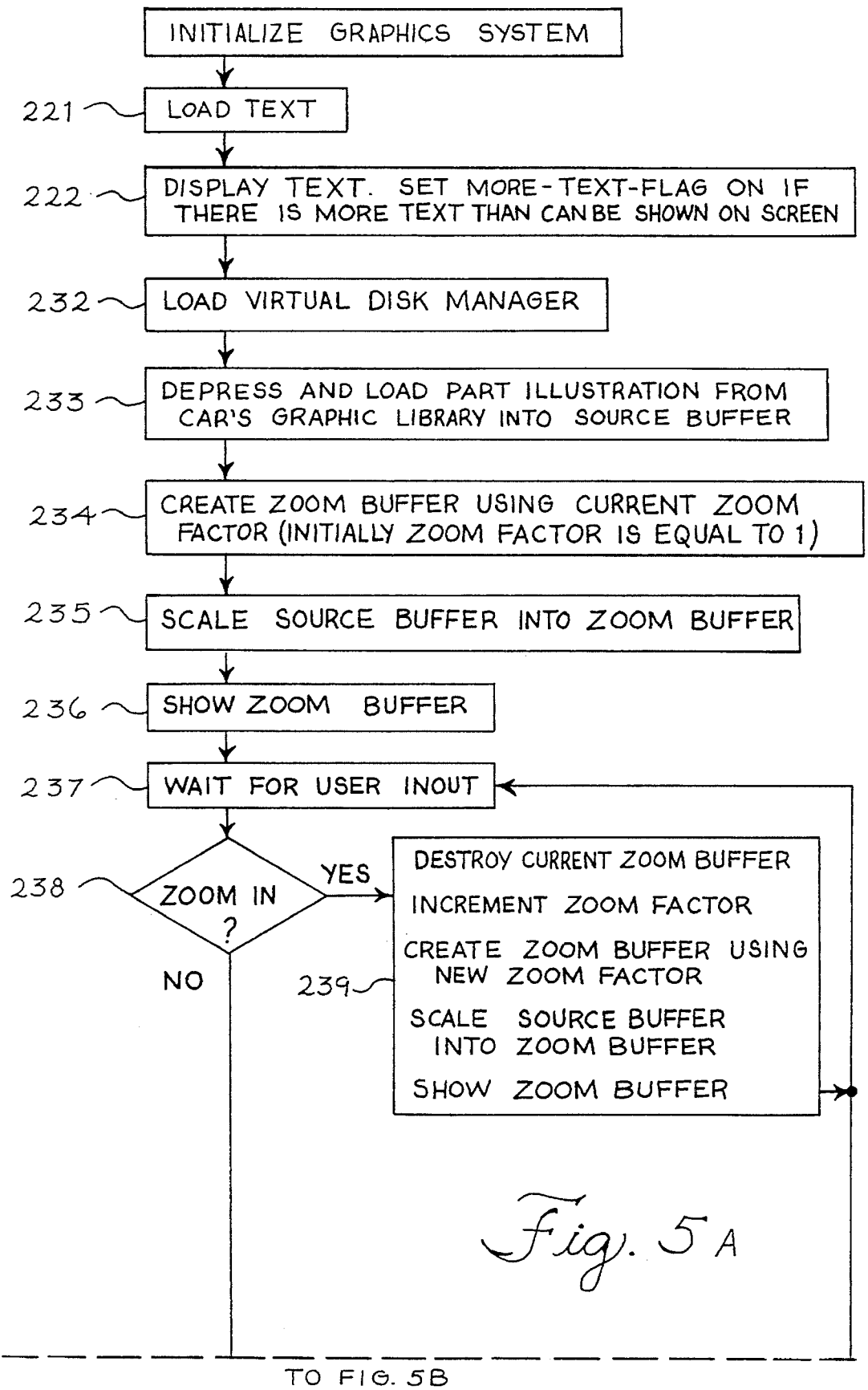
FIG. 5 is a flow chart of the graphics image generating function with a zoom feature.
Figure 5B:
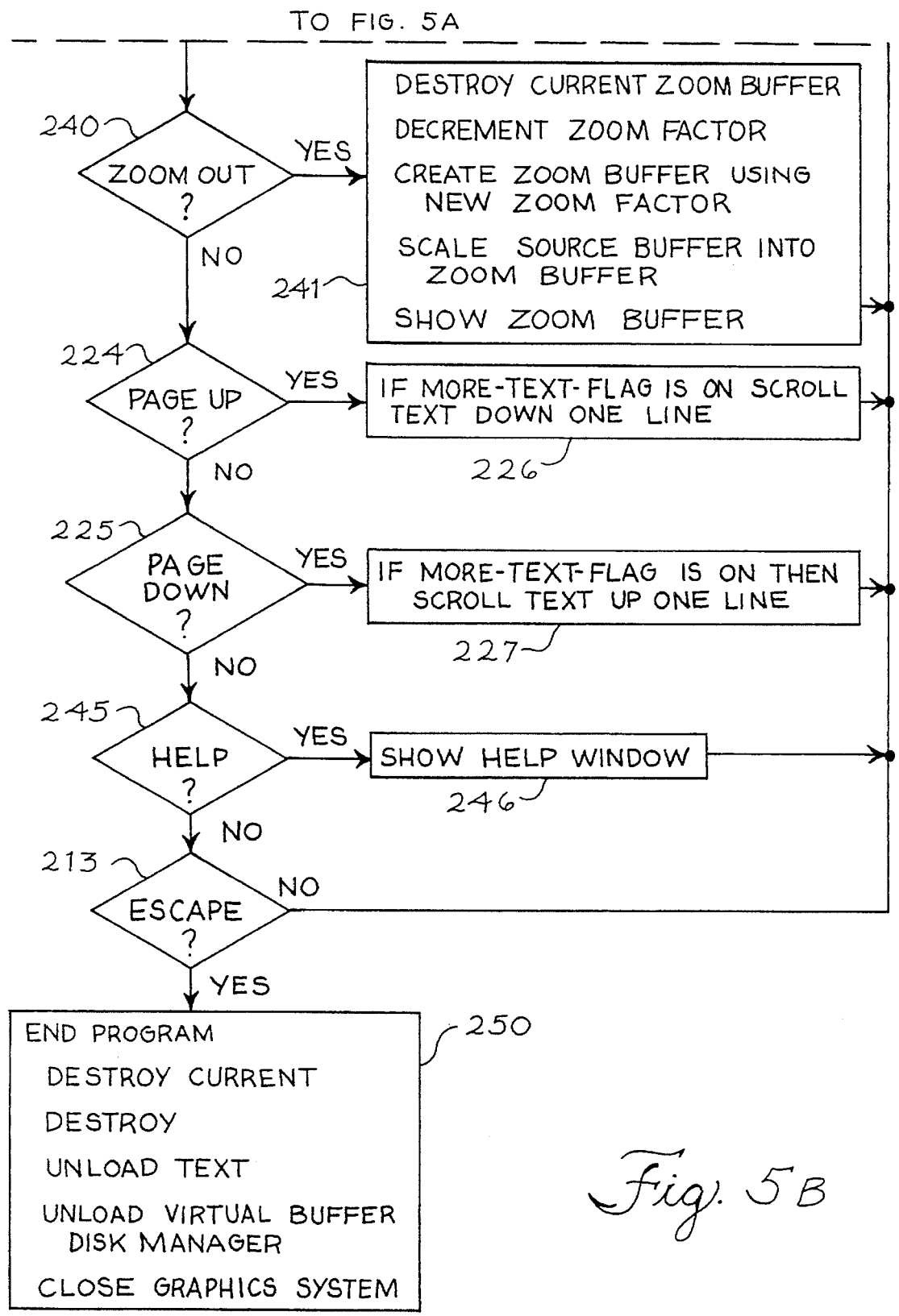

In FIG. 5, if a display of the parts is desired, then the computer loads the virtual disk manager 232 for memory management. Accordingly, the computer decompresses 233 and loads the part illustration from the car graphic library into a source buffer. Then, the system creates 234 a zoom buffer using a zoom factor. Initially, the zoom factor is equal to one. The source buffer is scaled 235 into the zoom buffer. The zoom buffer is shown 236 and the system waits 237 for user input. If the user desires to zoom in 238, then the system destroys the current zoom buffer, increments the zoom factor, creates a zoom buffer using a new zoom factor, and scales the source buffer into the zoom buffer, and shows the zoom buffer. With the zoom buffer being displayed, then the system waits 237 for user input. If the user desires to zoom out 240, then the computer destroys the current zoom buffer, decrements the zoom factor, creates the zoom buffer using a zoom factor, scales the source buffer into the zoom buffer, and shows the zoom buffer.

The system has the option 245 to display or show 246 a help window. At completion of using of the system, that is the end of the program, the computer destroys the current contents of the zoom buffer, destroys the contents of the source buffer, unloads text, unloads the virtual buffer disk manager, and closes the graphics system 250.

Figure 6:
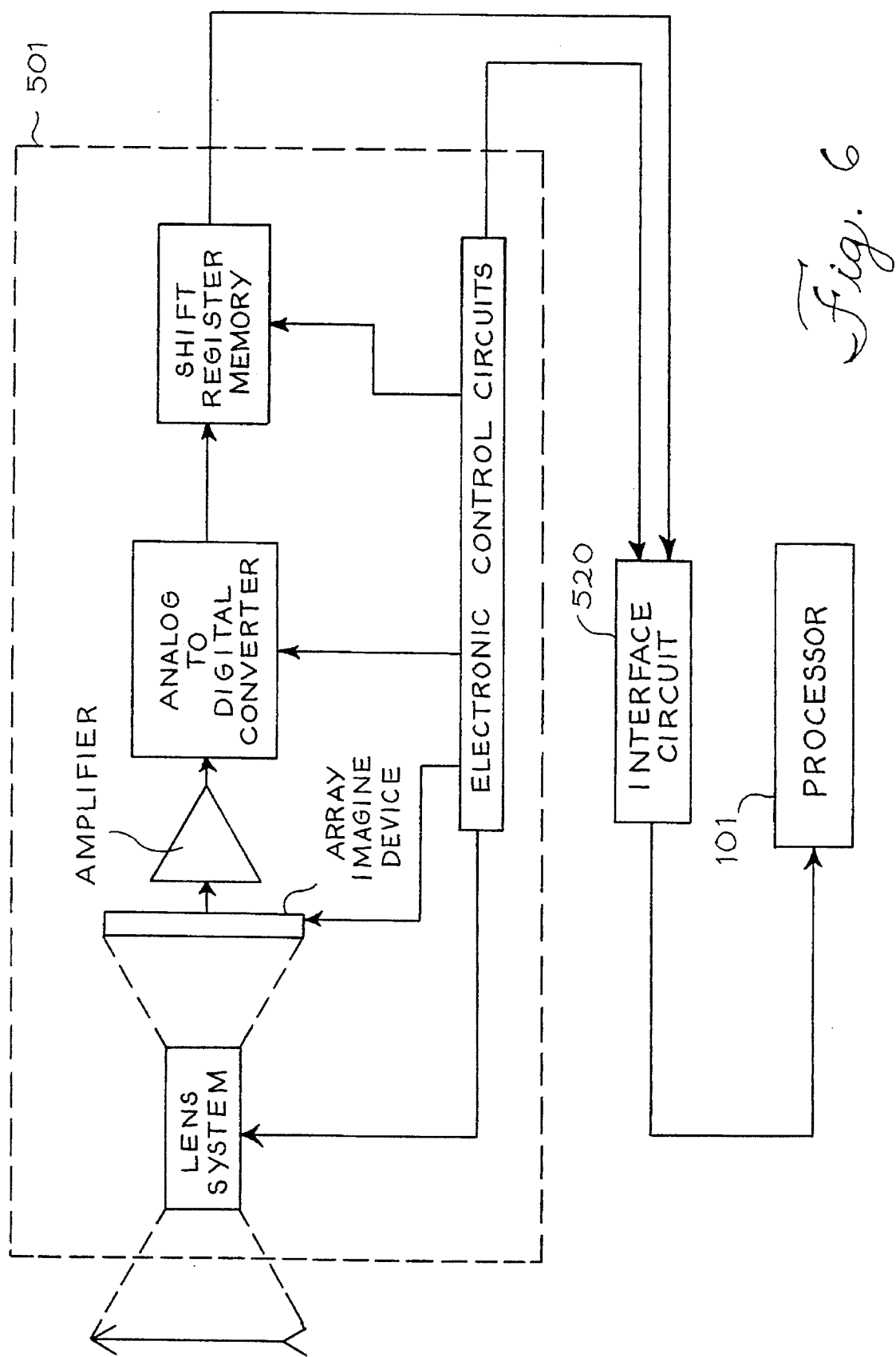
FIG. 6 shows a diagram of an imaging device of the present invention.

The present invention, as illustratively shown in FIG. 6, also includes imaging means embodied as imaging device 501 for capturing an electronic image, as an electronic photograph, in digital form of the damaged vehicle. An example of an imaging device 501 is an electronic camera disclosed in U.S. Pat. No. 4,074,324 to Barnett, which is incorporated herein by reference. Alternatively, the imaging device 501 may be embodied as a videotape camera, a digital camera, a still camera, a video cassette recorder (VCR), or a digital imaging system. Interface means, embodied as interface circuit 520, as shown in FIG. 6, is provided for transferring the electronic image from the imaging device 501 through a data port to the memory means of the processor 101. The display monitor 103 may display the electronic image of the damaged vehicle on the display with the list of groups of parts for the damaged vehicle, with the parts description, or with the first part.

In use, a user using the processor selects a part from the data base menu, with the data base menu being displayed on the display monitor 103. The processor 101 retrieves from the mass storage device 105 a parts graphics image of the selected part, which is stored in compressed digital form. The processor decompresses the parts graphics image, each time that the parts graphics image is needed, to a raster format for display on the display monitor 103. The processor 101, using graphics means, also generates an enlarged or magnified graphics image from the parts graphics image. The enlarged or magnified graphics image may be, for example, a 4:1 enlargement of the parts graphics image. To allow rapid display, scrolling of parts, and enlarged graphics images in realtime, the two entire images, i.e. the parts graphics image and the enlarged graphics image, are loaded into the virtual memory buffers. The parts graphics image is stored in the first memory buffer 111, and the enlarged graphics image is stored in the second memory buffer 112. The first and second memory buffers can be a virtual memory buffer located in conventional computer memory, expanded memory, extended memory, or disk memory. Also, the processor may store the parts graphics image in the first memory buffer 111 prior to generating the enlarged graphics image from the parts graphics image.

The operator may select, after the parts graphics image and the magnified graphics image are stored in the first memory buffer 111 and the second memory buffer 112, respectively, either the parts or enlarged graphics image for display on the display monitor 103. In practice, the operator selects a part from the data base menu for display on the display monitor 103. In response to the selection, the processor 101 retrieves a graphics image from the mass storage device 105, decompresses the graphics image as the parts graphics image, stores the parts graphics image in the first memory buffer 111, generates a magnified graphics image, and stores the magnified graphics image in the second memory buffer 112. The parts graphics image is also stored in the video memory 108 and displayed on the display monitor 103.

The operator can select a region of the parts graphics image for magnifying, by displaying a portion of the enlarged graphics image on the display monitor 103. Normally an illustration window is placed over the parts graphics image of the region to be enlarged. In response to an operator command, the processor 101 can display a corresponding region of the enlarged graphics image through the window. Alternatively, in response to an operator command, the processor can enlarge the window, thereby displaying a larger region of the enlarged graphics image. The graphics image can be enlarged as many times as memory allows, or can be reduced repeatedly until the graphics image fits completely within the illustration window. Further, graphics images in the illustration window can be panned by user input to view portions of the graphics image which lie outside the illustration window.

The processor 101 does not generate an enlarged graphics image in response to the operator's selection, but merely swaps a corresponding region of the enlarged graphics image from the second memory buffer 112 into video memory 108 for display on top of the parts graphics image by overlaying the enlarged graphics image on the original parts graphics image. The parts graphics image and the enlarged graphics image correspond to the data base parts description.

The present invention also includes a method using a processor having a display and memory means for storing digital data including a parts graphics image. The method comprises the steps, using the processor, of inputting 201 vehicle-identification data of a damaged vehicle into the processor, displaying 202, on the display monitor 103, a list of groups of parts for the damaged vehicle; and selecting 203 from the list of groups of parts a first group of parts for display. A user has the option to not select 203 a group of parts, and instead to return 215 to the main menu and input 201 vehicle-identification data. If a first group of parts is selected 203, then the processor 101 displays 204, on the display monitor 103, the first group of parts, and the user may select 205 from the first group of parts a first part for display.

A user has the option to not select 205 the first part, and instead to return 216 to displaying 204 the parts description or to displaying 202 the parts groups of damaged vehicle 205. If a first part is selected 205 then the processor retrieves 206 from memory means, in response to selecting the first part, a first parts graphics image and/or a first cost for replacing the first part. The processor 101 then loads 207, the first parts graphics image into a first buffer. The processor 101 displays 208, from the first buffer onto the display monitor 103, the first parts graphics image 202.

A user has the option to select 209 the first magnified graphics image for display. If the first magnified graphics image is selected, then the processor 101 swaps 210 the first magnified graphics image with the parts graphics image from the second buffer onto the display. If the first magnified graphics image is not selected 209, then the user has the option to finish 213 displaying the first parts graphics image and erasing 214 the first buffer and the second buffer. After erasing 214 the first buffer and the second buffer, the user may select 205 from the first group of parts a second part for display. If the second part is selected, then the processor retrieves 206 from memory means, in response to selecting the second part, a second cost for replacing the second part, loads 207 the second parts graphics image into the first buffer, and generates 207, from the parts graphic image, a magnified graphics image in digital form. The processor 101 then loads 206 the second magnified graphics image into a second buffer and displays 208, from the first buffer onto the display, the second parts graphics image. The user then has the option to select the second magnified graphics image for display.

If the second magnified graphics image is selected, then the processor swaps 210 the second magnified graphics image with the second parts graphics image from the second buffer onto the display.

The processor also computes a sum of the first cost and the second cost, retrieves from the memory means a replacement cost for the first group, determines a lower cost of the replacement cost and the sum, and displays the lower cost on the display.

The method may further comprise the steps of capturing, using imaging means, an electronic image in digital form of the damaged vehicle, transferring the electronic image from the imaging means to the memory means of the processor, and displaying the electronic image on the display with the list of groups of parts for the damaged vehicle, with the parts description, or with the first part.

Using the computer system and method, the present invention comprises a communications network and method for communicating vehicular information and repair estimates, with the communications network including claim terminals and body shop terminals for use by accident adjusters and by body shops, respectively, with each claim terminal and each body shop terminal being embodied as a personal computer, as a minicomputer, or as a mainframe, and with each claim terminal and each body shop terminal including the computer system of the present invention. In the preferred embodiment, the claim terminals may include COMPAQ™ laptop computers which permit accident adjusters, using modems and telephone lines, to access automobile parts information and to request repair and replacement costs from body shops while the accident adjusters are travelling away from the office.

Figure 7:
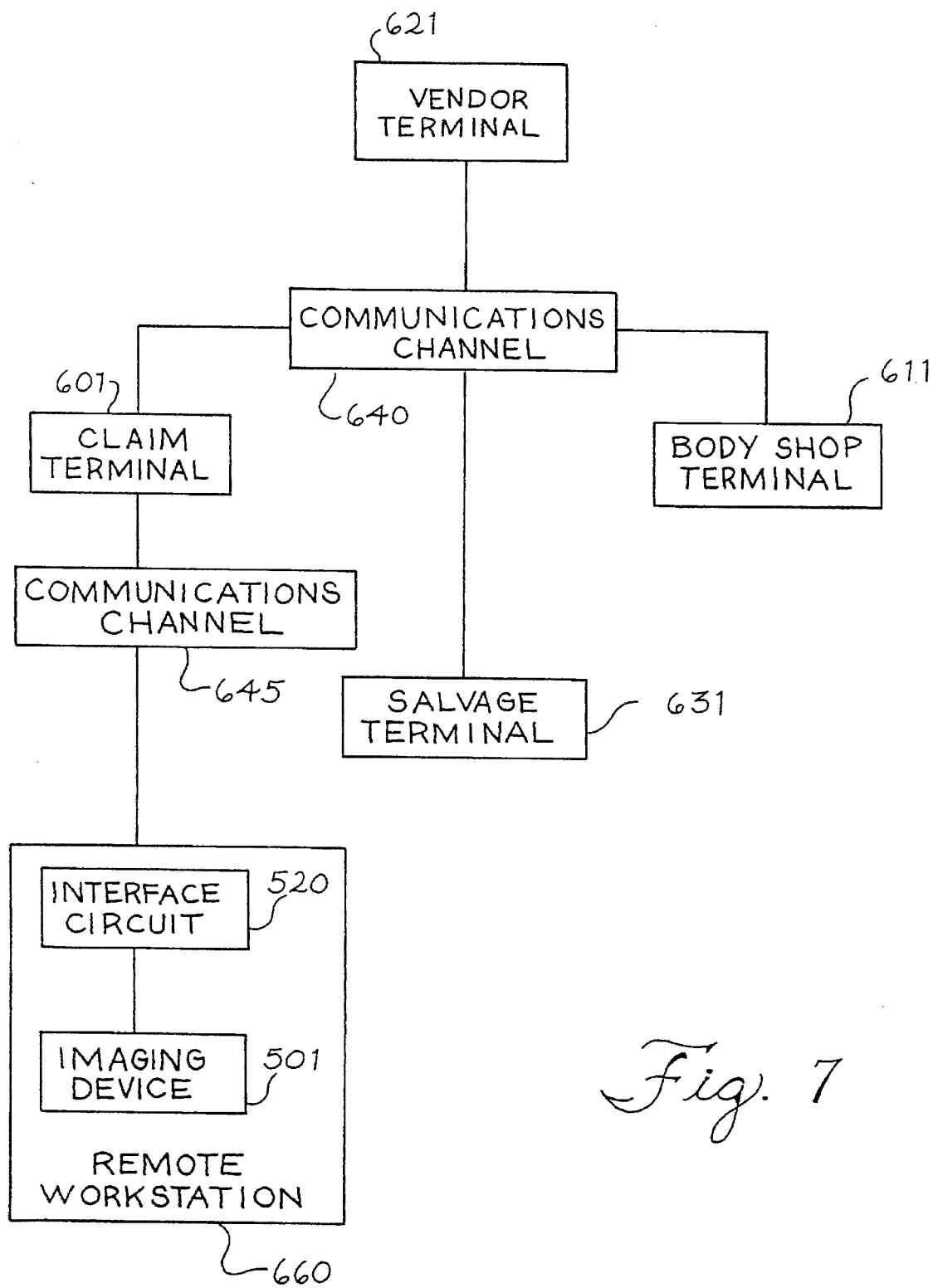
FIG. 7 illustrates a block diagram of the communications network of the present invention.

In an exemplary arrangement, as shown in FIG. 7, the communications network comprises imaging means for capturing an electronic image in digital form of a damaged vehicle, interface means, at least one claim terminal 601, and at least one body shop terminal 611. The claim terminal 601, the body shop terminal 611, the vendor terminal 621, and the salvage terminal 631 are coupled through a communications channel 640. The interface means, which may be embodied as an interface circuit 520, is operatively coupled, through a communications channel 645, to the imaging means, embodied as imaging device 501, and to a data port of the claim terminal 601, with the interface means for transferring the image from the imaging means through said data port to the memory means of the claim terminal 601. The interface circuit 520 and the imaging device 501 may be included in a remote workstation 660 coupled to the communications channel 645.

Figure 8:
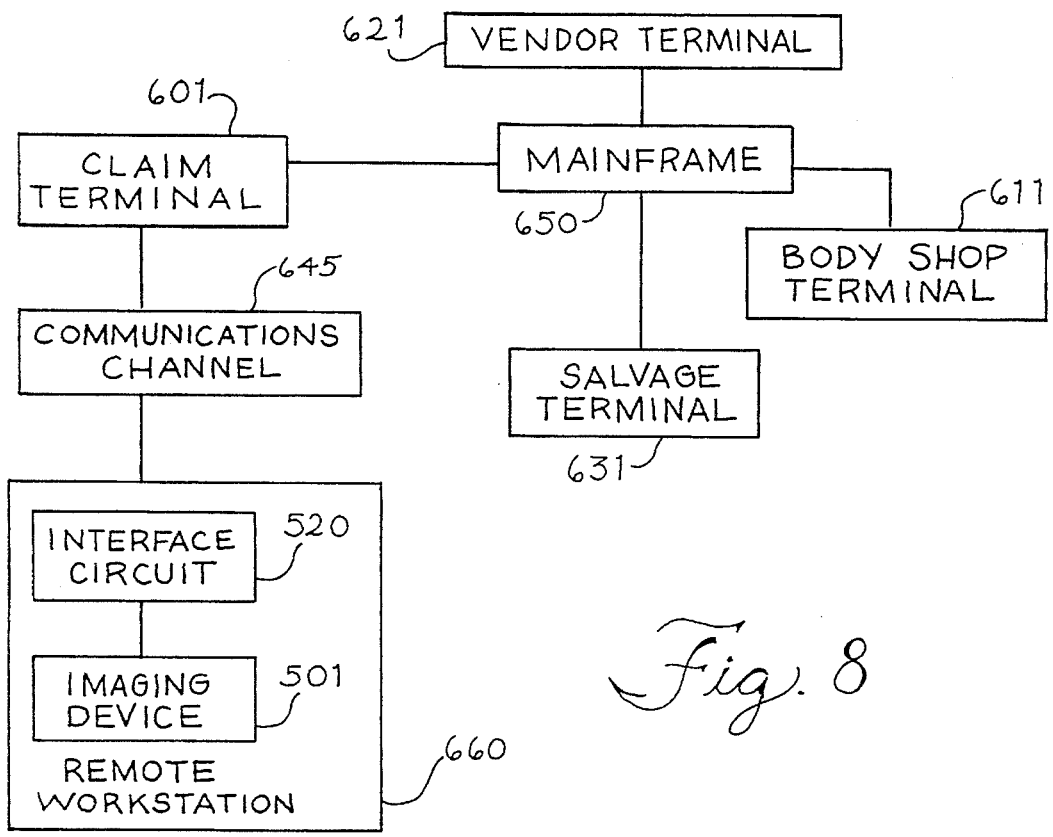
FIG. 8 shows an alternative embodiment of the communications network of the present invention.

In an alternative embodiment of the communications network, as illustratively shown in FIG. 8, the communications network comprises imaging means for capturing an electronic image in digital form of a damaged vehicle, interface means, at least one claim terminal 601, and at least one body shop terminal 611. The interface means, which may be embodied as an interface circuit 520, is operatively coupled to the imaging means, embodied as imaging device 501, and to a data port of the claim terminal 601, with the interface means for transferring the image from the imaging means through said data port to the memory means of the claim terminal 601. The claim terminal 601, the body shop terminal 611, the vendor terminal 621, and the salvage terminal 631 are coupled through a mainframe 650. The mainframe 650 may be employed to provide an electronic mail box system, allowing messages, text, and electronic images to be sent as E-Mail to the terminals of the communications network.

Figure 9A:
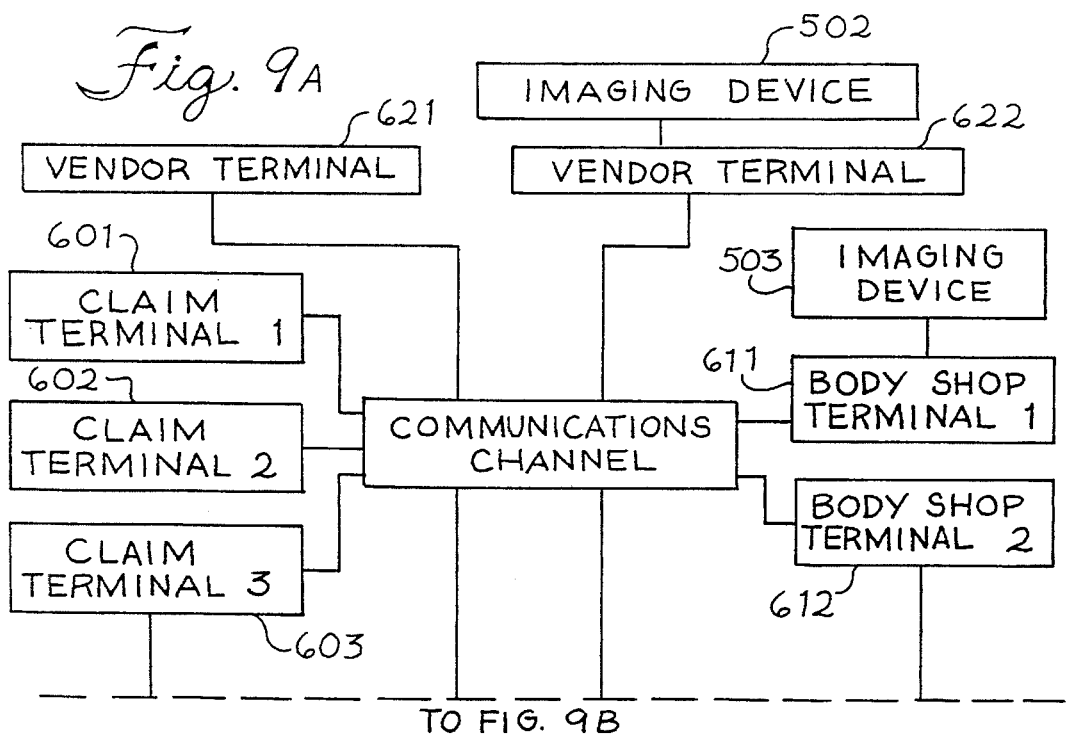
FIG. 9 illustrates another alternative embodiment of the communications network of the present invention.
Figure 9B:
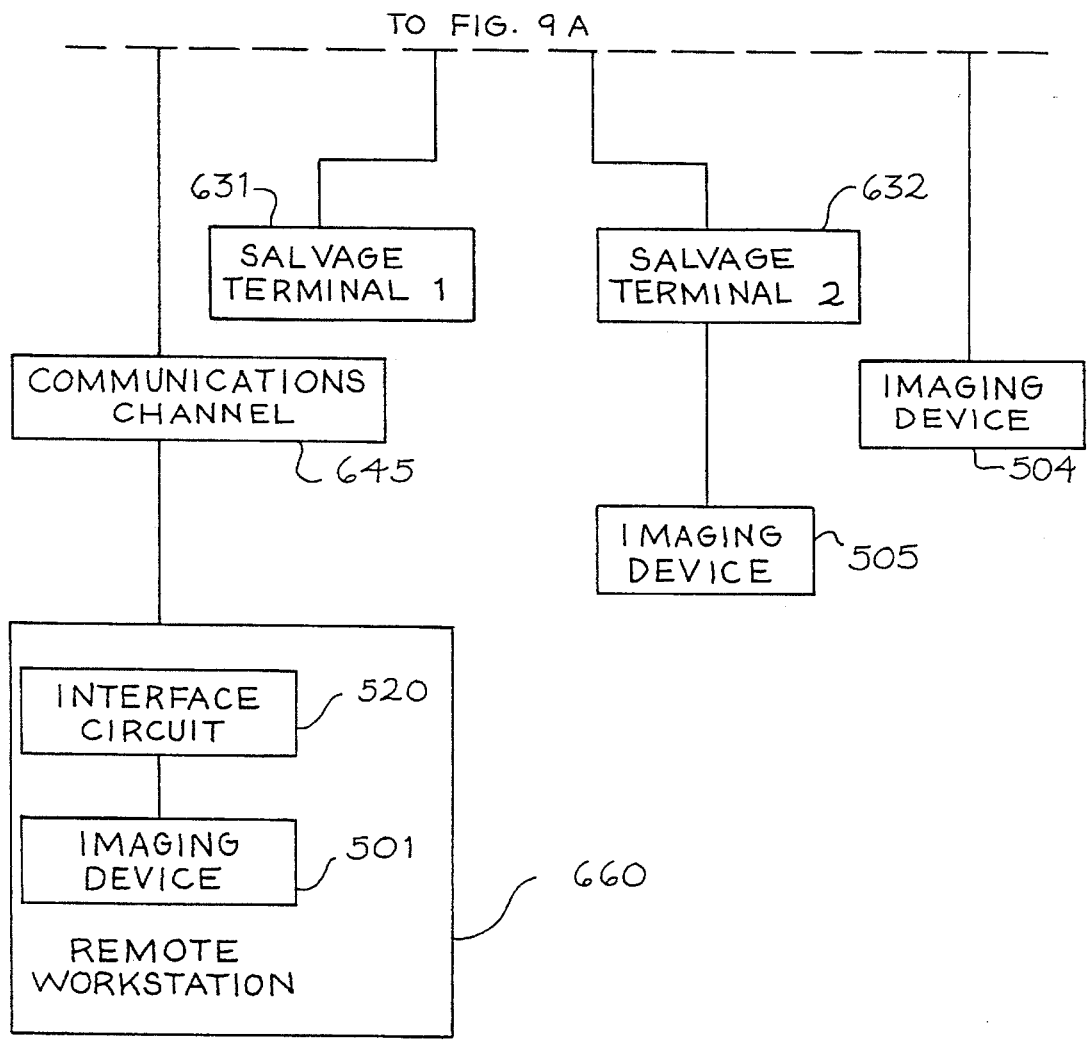

In an alternative embodiment of the communications network, as illustratively shown in FIG. 9, the communications network includes a number of claim terminals 601, 602, 603, and body shop terminals 611, 612, 613. Each claim terminal may be operatively coupled to imaging means, embodied as imaging devices 501–505, and to a communication channel 640, and each claim terminal sends assignment data over the communications channel to the body shop terminals. The assignment data involves information regarding accident claims, including customer information, vehicle information, damage information, and, optionally, an electronic image from imaging means of the damaged section of the vehicle. The communications channel 640 may include a telephone network, with each claim terminal coupled to the telephone network by a corresponding modem, or alternatively, the communications channel 640 may include a radio network.

Similarly, each body shop terminal is operatively coupled to the claim terminals through the communications channel 640 such as, for example, a telephone network using modems for connecting the body shop terminals to the telephone network. For example, with a claim terminal 601 sending assignment data regarding a claim handled by an adjuster, over the communications channel 640, to body shop terminal 611, the body shop terminal 611 receives the assignment data, and responds to the assignment data from a claim terminal 601 by calculating and sending a cost estimate and, optionally, a supplemental estimate to the claim terminal 601.

As shown in FIGS. 7 and 8, the communications network of the present invention may also include at least one vendor terminal 621, operatively coupled to the body shop terminals through the communications channel 640. A body shop terminal 611, for example, may send parts graphics images and/or parts order information to vendor terminal 621 to request a specific part or parts for repair or replacement. The vendor terminals are to be used by vendors to provide the body shops with information regarding the availability of a new part. The vendor, using a vendor terminal 621, may respond to such parts graphics images and/or parts order information from a body shop terminal 611 by sending an acknowledgement signal to the requesting body shop terminal 611. Also, the vendor terminal 621 may also send back order parts invoice information to the requesting body shop terminal 611 in response to such parts graphics images and/or parts order information.

Furthermore, the communications network of the present invention may include at least one salvage terminal 631, operatively coupled to the body shop terminals through the communications channel 640. The salvage terminals allow body shops to contact salvage shops to request the availability of used parts for use in the repair and replacement of damages vehicle parts. The body shop terminals send first parts information to request the availability of used parts at a given salvage shop. In response to such first parts information, the salvage terminals may be used to send information of used parts to a body shop terminal 611.

The present invention further includes a communications method, using the communications network, of inputting vehicle-identification data of a damaged vehicle into a claim terminal, sending the vehicle-identification data from the claim terminal to a body shop terminal via the communications channel 640, using the body shop terminal to determine a lower cost for repair and replacement of parts, and sending the lower cost as an estimate from the body shop terminal to the claim terminal.

The communications method, using the communications network, may also include the steps of capturing, with imaging means, an electronic image in digital form of a damaged vehicle; transferring the electronic image from the imaging means to the memory means of the claim terminal; sending the electronic image with the vehicle-identification data, as assignment data, from the claim terminal to the body shop terminal; and displaying the electronic image on the display of the body shop terminal with a list of groups of parts for the damaged vehicle, with a part description, and/or with a first part.

The communications method, using the communications network, may also include the step of sending parts order information from the body shop terminal to a vendor terminal, and also may include the step of sending graphics images from the body shop terminal to the vendor terminal.

In addition, the communications method, using the communications network, may include the step of sending from the vendor terminal an acknowledgement signal to the body shop in response to the sending of parts order information from the body shop. Further, the vendor terminal may also send from the vendor terminal a back order parts invoice to the body shop in response to the sending of parts order information from the body shop.

Moreover, the communications method, using the communications network, may include the steps of sending first parts information from the body shop terminal to a salvage terminal, and sending user parts information from the salvage terminal to the body shop terminal.

In use, the operation of the communications network and method is illustratively shown in FIGS. 10–19. First, FIG. 10 illustrates a damage scenario with a damaged car driveable to a body shop employing a direct repair program (DRP). After a damage or a loss of the car, the insured calls the insurance company, and the insurance company suggests the DRP body shop and informs the insured of car rental options. The body shop performs a computerized estimate using estimating computer software; for example, EZEst™. The body shop also takes electronic images of the car; keeps the estimate and images on local storage, for example a disk drive, or sends the estimate and images to a library for storing estimates and images; reviews the estimate with the insured; receives repair authorization; and creates an Estimate-Of-Record (EOR). The body shop then E-Mails the EOR and images to the insurance company. The insurance company receives the E-Mail of the EOR and the images; prepares a work order; and E-Mails an authorization number or work order number to the body shop. The insured signs the work order and schedules repair work with the body shop.

Figure 14:
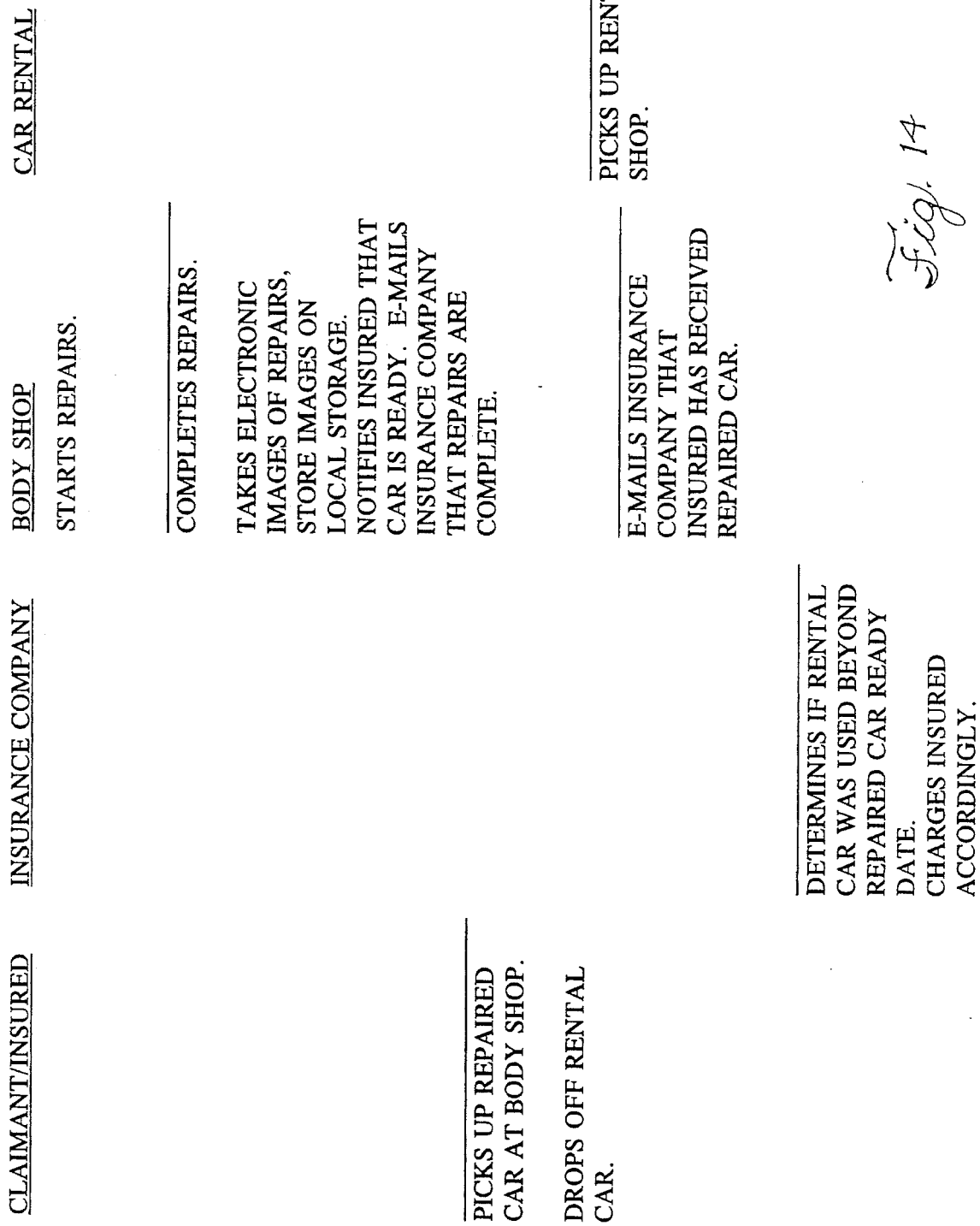

The body shop searches for Like Kind and Quality (LKQ) parts, using the procedure shown in FIG. 17; searches for new or aftermarket (A/M) parts, using the procedure shown in FIG. 18; receives all of the necessary parts; confirms scheduled repairs; and repairs the damaged car, using the procedure shown in FIG. 14. Optionally, the insured may obtain a rental car from a car rental agency.

Second, as shown in FIG. 11, if the car is driveable, the car may be brought to a non-DRP body shop, with the insured contacting the insurance company and the insurance company suggesting a drive-in estimate location at a body shop or at the location of an appraiser or adjuster. The insured brings in the car to the body shop and requests an estimate, and either the body shop or the appraiser/adjuster performs a computerized estimate using estimating software; for example, EZEst™. The body shop or the appraiser/adjuster takes electronic images of the car; keeps the estimate and images on local storage, for example a disk drive, or sends the estimate and images to a library for storing estimates and images; and informs the insured of car rental options.

The insured determines where and when to get the car repaired, schedules a repair date, and signs a repair order. If an appraiser/adjuster is utilized, the appraiser/adjuster gives the insured a check for the estimate repairs. However, if an appraiser/adjuster is not utilized, the body receives repair authorization; confirms insurance coverage; and schedules repair work or receives the car for repairs.

The estimate is sent from the body shop to the appraiser/adjuster, or alternatively, the estimate is sent from the appraiser/adjuster to the body shop, depending on whether the body shop or the appraiser/adjuster performed the computerized estimate; and the recipient of the estimate reviews the estimate.

Figure 16:
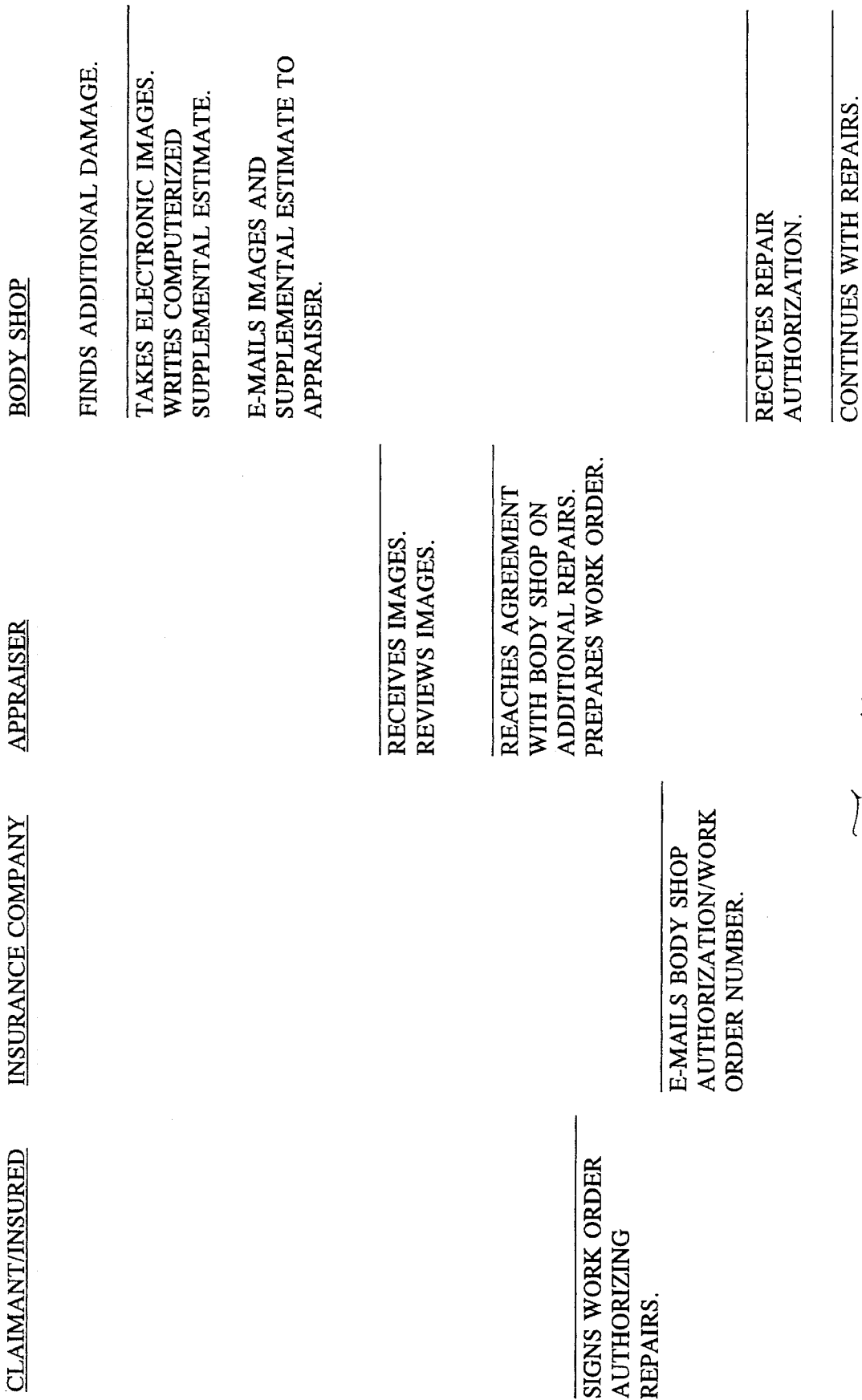

If the body shop determines that the repairs exceed the appraiser/adjuster's estimate, the body shop performs its own computerized estimate; takes electronic images of the car; contacts the appraiser/adjuster; and follows an Estimate Requires Supplements procedure as shown in FIG. 16.

After the Estimate Requires Supplements procedure is performed, the body shop continues with the repairs. The body shop searches for Like Kind and Quality (LKQ) parts, using the procedure shown in FIG. 17; searches for new or aftermarket (A/M) parts, using the procedure shown in FIG. 18; receives all of the necessary parts; confirms scheduled repairs; and repairs the damaged car, using the procedure shown in FIG. 14. Optionally, the insured may obtain a rental car from a car rental agency.

Third, as shown in FIG. 12, if the car is not driveable, the car may be brought to a DRP body shop by towing. Because the car is not driveable, the insured has the car towed to a lot or impound yard. When insured calls the insurance company, the insurance company suggest the insured move the car to the DRP body shop and informs the insured of car rental options. Either the insured or the insurance company calls the body shop to tow the car from the tow lot or impound yard.

Figure 15:
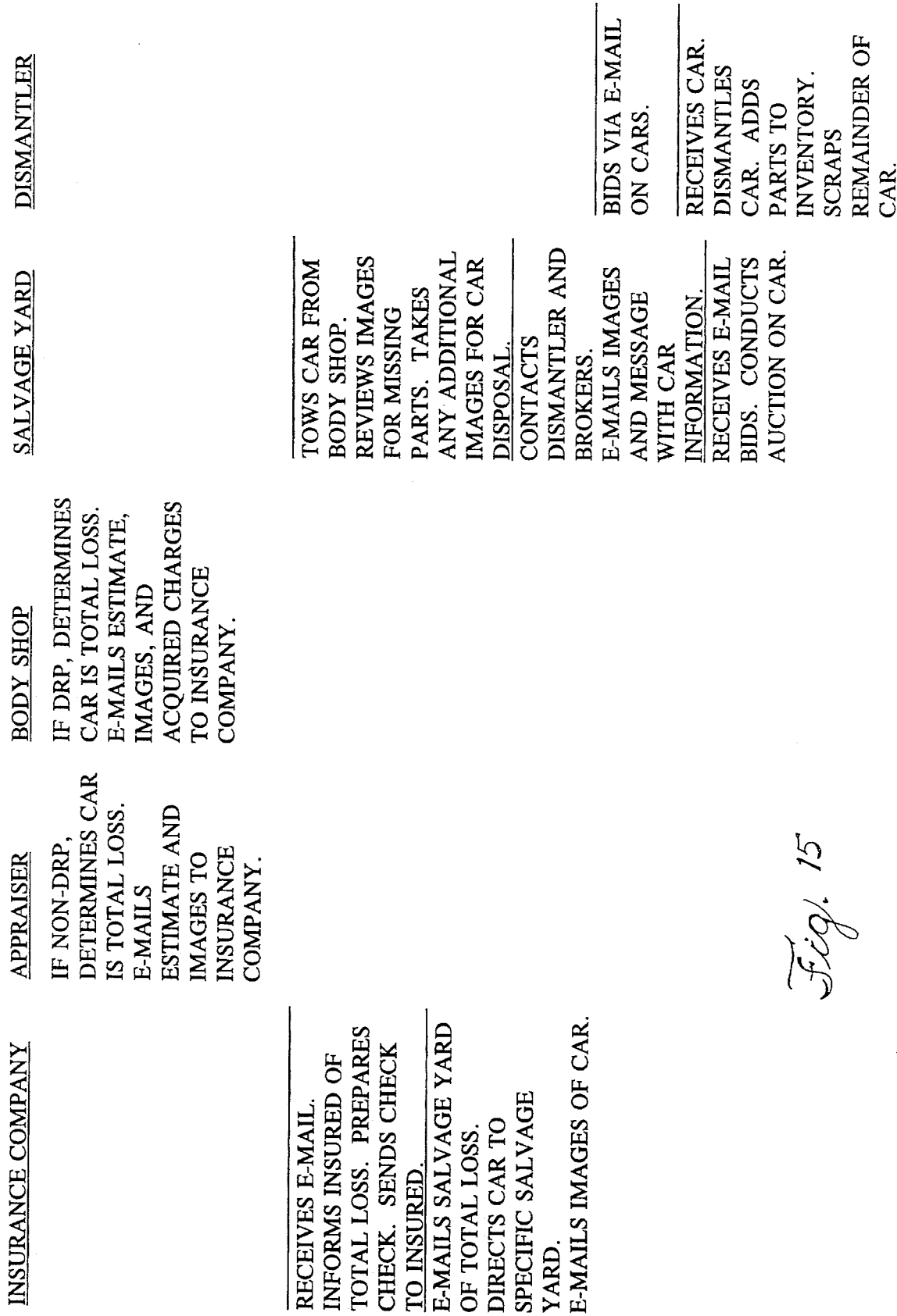

The body shop performs a computerized estimate using estimating computer software; for example, EZEst™. The body shop also takes electronic images of the car; keeps the estimate and images on local storage, for example a disk drive, or sends the estimate and images to a library for storing estimates and images; and reviews the estimate with the insured. If the car is deemed a Total Loss, the body shop performs a Total Loss scenario, using a Total Loss procedure as shown in FIG. 15.

Either the insured authorizes repairs to the car or authorized that the car be torn-down. Upon receiving the repair authorization or the tear-down authorization, the body shop creates a computer EOR; E-Mails the EOR and the images to the insurance company; and schedules the repair work.

The insurance company receives the E-Mail of the EOR and the electronic images; prepares a work order; and sends an authorization number or work order number to the body shop. In addition, an auditor may receive the EOR and electronic images and may audit the electronic images and estimate.

The body shop then searches for Like Kind and Quality (LKQ) parts, using the procedure shown in FIG. 17; searches for new or aftermarket (A/M) parts, using the procedure shown in FIG. 18; receives all of the necessary parts; confirms scheduled repairs; and repairs the damaged car, using the procedure shown in FIG. 14.

Figure 13:
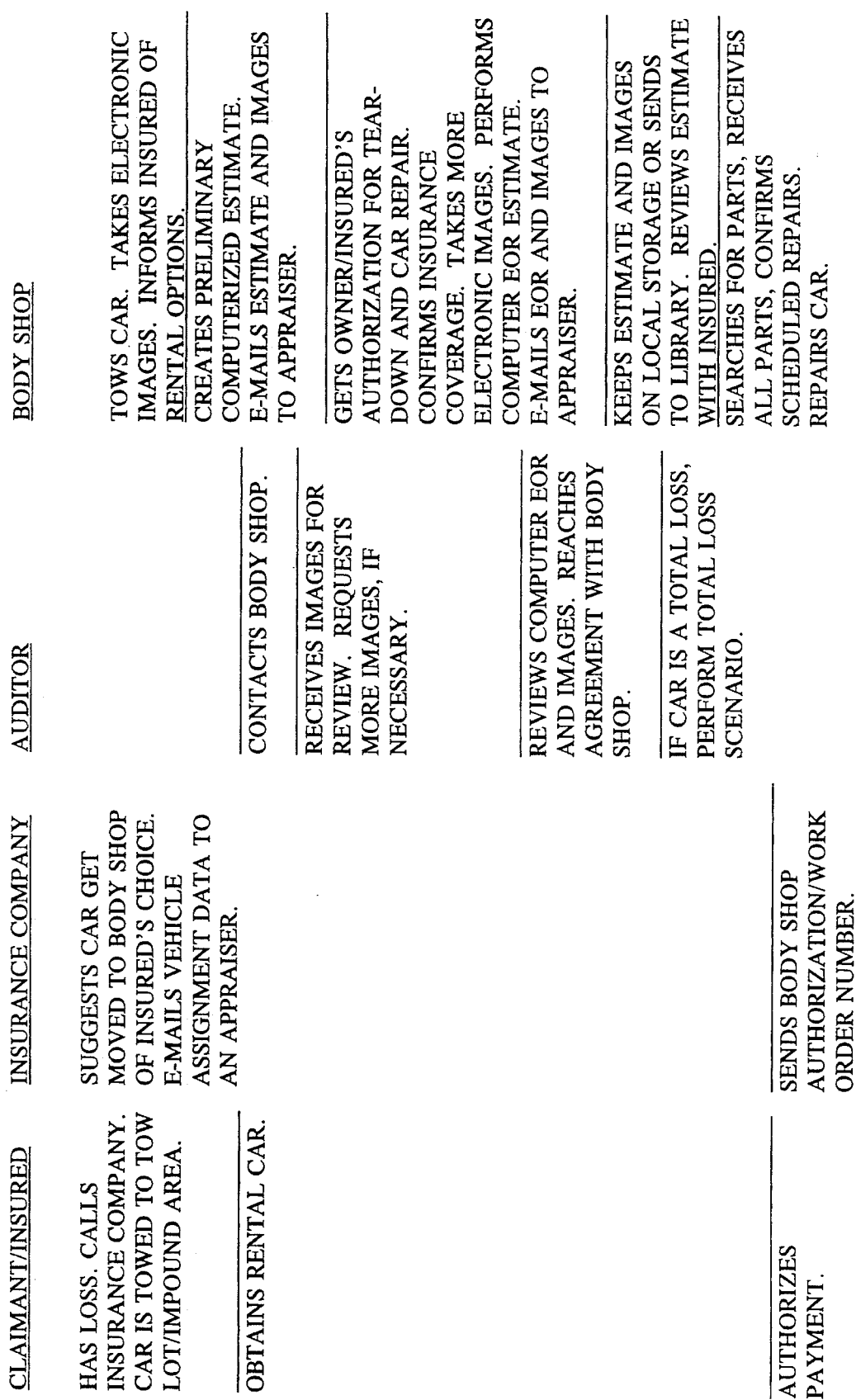

Fourth, as shown in FIG. 13, if the car is not driveable, the car may be brought to a non-DRP body shop. The insured has the car towed to a tow lot or impound area, and the insured calls the insurance company. Because the car is not driveable, the insurance company suggests that the insured move the car to the body shop of the choice of the insured, and the insurance company may also inform the insured of car rental information. The insurance company also E-Mails vehicle assignment data to an appraiser/adjuster. Subsequently, the appraiser/adjuster contacts the body shop.

Either the body shop tows the car or receives the towed car; the body shop takes electronic images of the car; and the body shop may provide car rental information to the insured. The body shop creates a preliminary computerized estimate using computer estimate software; for example, EZEst™. The body shop E-Mails the estimate and images to the appraiser/adjuster. The appraiser/adjuster subsequently receives the images for review and request more images, if necessary.

The body shop obtains authorization from the insured or from the owner to either repair the car or tear down the car, and the body shop confirms insurance coverage. The body shop takes more electronic images, performs a computer EOR estimate, and E-mails the EOR and images to the appraiser/adjuster. The appraiser/adjuster reviews the computer EOR and images, and reaches an agreement with the body shop.

The body shop keeps the estimate and images on local storage, for example a disk drive, or sends the estimate and images to a library for storing estimates and images; and reviews the estimate with the insured. If the car is deemed a Total Loss, the appraiser/adjuster a Total Loss scenario, using a Total Loss procedure as shown in FIG. 15.

After the insured authorizes payment for repairs, the insurance company sends an authorization number or a work order number to the body shop, and the body shop searches for Like Kind and Quality (LKQ) parts, using the procedure shown in FIG. 17; searches for new or aftermarket (A/M) parts, using the procedure shown in FIG. 18; receives all of the necessary parts; confirms scheduled repairs; and repairs the damaged car, using the procedure shown in FIG. 14.

In each of the described damage scenarios, whether the car is driveable or not driveable, and whether the body shop is a DRP shop or a non-DRP shop, as illustrated in FIGS. 10–13, upon authorization for repairs, the body shop searches and obtains the necessary parts for repairs and performs a repair scenario as illustrated in FIG. 14. The body shop starts and completes the repairs to the car. The body shop then takes electronic images of the repairs; stores images on local storage, for example a disk drive; and notifies the insured that the repaired car is ready. In addition, the body shop E-Mails a notification to the insurance company that the repairs are completed.

The insured picks up the repaired car at the body shop, and the insured drops off any rental car for later retrieval by a car rental agency. The body shop proceeds to E-Mail a notification to the insurance company that the insured has received the repaired car. The insurance company determines if the rental car was used beyond the ready date of the repaired car, and the insurance company charges the insured accordingly.

As illustrated in FIG. 15, if the damaged car is deemed a Total Loss, a Total Loss scenario is performed. If the body shop is a non-DRP shop, an appraiser/adjuster determines if the car is a Total Loss, and the appraiser/adjuster E-Mails an estimate and electronic images to the insurance company. However, if the body shop is a DRP shop, the body shop determines if the car is a Total Loss, and the body shop E-Mails the estimate, images, and any acquired charges to the insurance company, with acquired charges including tow charges, tear-down charges, and storage charges.

Upon receiving the E-Mail, the insurance company informs the insured that the car is a Total Loss, and the insurance company prepares and sends a settlement check to the insured for the Total Loss. The insurance company also E-Mails a notification of the Total Loss to a salvage yard or salvage pool, and directs the car to be sent to a specific salvage yard. In addition, the insurance company E-Mails electronic images of the car to the salvage yard. The salvage yard tows the car from the body shop; reviews the images for missing parts, and takes any additional images for car disposal. The salvage yard proceed to contact dismantlers and parts brokers, and the salvage yard E-Mails images and messages including the car information to the dismantler and parts brokers.

The dismantlers and parts brokers bid via E-mail on the cars available at the salvage yard, while the salvage yard conducts an auction on the cars as the salvage yard receives E-Mail bids. After the auction, a dismantler receives a car deemed a Total Loss, dismantles the car, adds the resultant parts to the inventory of the dismantler, and scraps the remainder of the car.

As illustrated in FIG. 16, an Estimate Requires Supplements scenario is shown, where a body shop finds additional damage; takes electronic images; and writes computerized supplemental estimates using computer estimate software, for example, EZEst™.

The body shop E-Mails the images and supplemental estimate to an appraiser/adjuster, and the appraiser/adjuster receives and reviews the images. The appraiser/adjuster reaches an agreement with the body shop on the additional repairs, and the appraiser/adjuster prepares a work order. The insured signs the work order authorizing repairs, and the insurance company E-Mails an authorization number or work order number to the body shop. Upon receipt of repair authorization, the body shop continues with the repairs and the search for part for the car.

As illustrated in FIG. 17, a Search for LKQ Parts scenario is shown, with the body shop reviewing a computerized parts list; determining that other images are needed to obtain the correct parts; taking electronic images and image plates; and E-Mailing the parts list, images, and a message to a dismantler to obtain the necessary parts. On receiving the E-Mail, a dismantler reviews the dismantler's inventory; compares the available parts to the received images; determines which parts are possible matches; and E-Mails images of the available parts to the body shop.

On reviewing the dismantler's parts images, the body shop determines which parts to order, and E-Mails an order to the dismantler. The dismantler may initiate his/her own search for unavailable parts, updates an E-Mail message requesting parts, and forwards images and a message requesting parts to other contacts. The dismantler pulls requested parts from his/her inventory, prepares a parts order, and arranges delivery of parts to the body shop. Upon receipt of the delivered parts, the body shop inspects the parts for damage, correctness, and completeness. The body shop E-Mails to the dismantler to re-ship any alternative parts, and arranges to return any damaged parts.

An appraiser/adjuster receives an E-Mail from the body shop including images of the LKQ parts to determine if LKQ parts should be used. The body shop continues contact with the dismantler until the body shop receives all LKQ parts, and then the body shop continues with the repairs. The body shop also decides whether to get new parts, and the body shop searches for A/M parts.

As illustrated in FIG. 18, a Search for New or Aftermarket Parts scenario is shown, with a body shop reviewing a computerized parts list, determining if other images are needed to obtain the correct parts, taking electronic images and images of a parts plate, and E-Mailing a parts list, images, and a message requesting parts to a parts dealer or A/M parts distributor. The parts dealer or A/M parts distributor receives the E-Mail, reviews the inventory, compares the parts available to the images, and determines which parts to ship to the body shop. If the parts are unavailable, the parts dealer or A/M parts distributor updates the E-Mail message and forwards the images and message to local contacts or through a dealer network to obtain the necessary parts.

The parts dealer or A/M distributor pulls the available parts, prepares a parts order, and arranges delivery to the body shop. Upon delivery, the body shop inspects the parts for damage, correctness, and completeness.

The body shop E-Mails a message to the dealer to re-ship any alternative parts, and the body shop arranges to return any damaged parts to the dealer. The body shop continues to contact the dealer until the body shop receives all necessary parts of an undamaged and correct quality and quantity, and the body shop continues with the repairs to the car.

As illustrated in FIG. 19, the body shop may also perform a scenario with a damaged car abandoned by the owner/insured. If the car is abandoned before the body shop begins repairs due to the body shop having never been authorized to begin repairs. The body shop takes electronic images of the car, and attempts to lien sell the car. The body shop E-Mails images and information about the car accordingly to salvage yards, other body shops, etc., and the body shop also contacts a specific salvage yard, and performs the Total Loss Scenario as shown in FIG. 15.

As further illustrated in FIG. 19, if the car is abandoned after authorized repairs to the car are completed, the body shop notifies the insured that the car is repaired. If the insured does not pick up the repaired car, the body shop takes electronic images of the repaired car, E-Mails the images and car information to the insurance company, other body shops, and salvage yards. Either the insurance company or the body shop holding the repaired car may attempt to lien sell the repaired car, or the body shop may perform the Total Loss Scenario as shown in FIG. 15.

It will be apparent to those skilled in the art that various modifications can be made to the insurance claims estimate, text and graphics network and method of the instant invention without departing from the scope or spirit of the invention, and it is intended that the present invention cover modifications and variations of the insurance claims estimate, text and graphics network and method provided they come in the scope of the appended claims and their equivalents.

We claim:

1. A communications network for communicating vehicular information and repair estimates, said communications network comprising:

a communications channel;

imaging means for capturing an electronic image in digital form of a damaged vehicle;

a claim terminal, operatively coupled to said imaging means, operatively coupled to said communications channel, for sending assignment data, including customer information, vehicle information, damage information, and the electronic image, through said communications channel, the claim terminal comprising:

a display;

a data port;

a memory for storing digital data for a multiplicity of vehicles, said digital data including a data base of a plurality of groups of parts and a plurality of associated parts graphics images;

means for inputting vehicle-identification data of said damaged vehicle to said claim terminal;

first means responsive to the vehicle-identification data for displaying, on said display, said electronic image and a list of groups of parts for said damaged vehicle;

second means responsive to selecting a first group of parts from said list of groups of parts for displaying, on said display, said electronic image and a parts description from said data base of the first group of parts;

graphics means responsive to selecting a first part from the parts description for retrieving from said memory a first parts graphics image, stored in digital form and associated with said first part, said graphics means for loading said first parts graphics image into a first memory buffer, said graphics means for generating, in digital form, a first magnified graphics image from said first parts graphics image, and said graphics means for loading said first magnified graphics image into a second memory buffer;

third means responsive to loading said first parts graphics image into said first memory buffer for displaying, on said display, said electronic image and said first parts graphics image; and fourth means responsive to selecting said first magnified graphics image for swapping said first magnified graphics image from said second memory buffer with said first parts graphics image on said display, and displaying said electronic image with said first magnified graphics image;

interface means, operatively coupled to said imaging means, operatively coupled to said data port of said claim terminal, for transferring said electronic image from said imaging means through said data port to said memory means of said claim terminal;

a body shop terminal, operatively coupled to said claim terminal through said communications channel, responsive to assignment data from said claim terminal, for sending a cost estimate and a supplemental estimate through said communications channel to said claim terminal, for sending first parts information, parts order information, and parts graphics images through said communication channel, the body shop terminal comprising:

a display;

a data port;

a memory storing digital data for a multiplicity of vehicles, said digital data including a data base of a plurality of groups of parts and a plurality of associated parts graphics images;

means for inputting vehicle-identification data of said damaged vehicle to said body shop terminal;

first means responsive to the vehicle-identification data for displaying, on said display, said electronic image and a list of groups of parts for said damaged vehicle;

second means responsive to selecting a first group of parts from said list of groups of parts for displaying, on said display, said electronic image and a parts description from said data base of the first group of parts;

graphics means responsive to selecting a first part from the parts description for retrieving from said memory a first parts graphics image, stored in digital form and associated with said first part, said graphics means for loading said first parts graphics image into a first memory buffer, said graphics means for generating, in digital form, a first magnified graphics image from said first parts graphics image, and said graphics means for loading said first magnified graphics image into a second memory buffer;

third means responsive to loading said first parts graphics image into said first memory buffer for displaying, on said display, said electronic image and said first parts graphics image; and fourth means responsive to selecting said first magnified graphics image for swapping said first magnified graphics image from said second memory buffer with said first parts graphics image on said display, and displaying said electronic image with said first magnified graphics image;

a vendor terminal, operatively coupled to said body shop terminal through said communications channel, responsive to said parts graphics images and said parts order information from said body shop terminal, for sending to said body shop terminal an acknowledgement signal and back order parts invoice information; and a salvage terminal, operatively coupled to said body shop terminal through said communications channel, responsive to the first parts information, for sending information of used parts to said body shop terminal.

2. The communications network as set forth in claim 1 wherein said fourth means of said at least one body shop terminal, responsive to selecting said first parts graphics image, swaps said first parts graphics image with said first magnified graphics image on said display, and displays said first parts graphics image.

3. The communications network as set forth in claim 1 wherein said at least one body shop terminal further includes text means, responsive to selecting said first part from said parts description, for retrieving from said memory text information, stored in digital form and associated with said first part; and wherein said third means of said at least one body shop terminal displays, on said display, said text information on top of said parts graphics image.

4. The communications network as set forth in claim 3 wherein said text means of said at least one body shop terminal scrolls a text window over said first parts graphics image.

5. The communications network as set forth in claim 1, wherein said claim terminal further includes:

cost means responsive to selecting a first part from the parts description for retrieving from said memory a first cost for repairing said first part, said cost means responsive to selecting a second part from the parts description for retrieving from said memory a second cost for repairing said second part;

wherein said cost means responsive to selecting said first part and said second part retrieves from said memory a replacement cost for said first group and compares said replacement cost with a sum of said first cost and said second cost for determining which of said replacement cost and said sum have a lower cost; and wherein said third means displays on said display said lower cost.

6. The communications network as set forth in claim 5, wherein said claim terminal further includes:

overlap means responsive to said first cost and said second cost for determining any overlap cost and subtracting from a sum of said first cost and said second cost the overlap cost to produce a net cost; and wherein said third means displays on said display said net cost.

7. The communications network as set forth in claim 1, wherein said body shop terminal further includes:

cost means responsive to selecting a first part from the parts description for retrieving from said memory a first cost for repairing said first part, said cost means responsive to selecting a second part from the parts description for retrieving from said memory a second cost for repairing said second part;

wherein said cost means responsive to selecting said first part and said second part retrieves from said memory a replacement cost for said first group and compares said replacement cost with a sum of said first cost and said second cost for determining which of said replacement cost and said sum have a lower cost; and wherein said third means displays on said display said lower cost.

8. The communications network as set forth in claim 7, wherein said body shop terminal further includes:

overlap means responsive to said first cost and said second cost for determining any overlap cost and subtracting from a sum of said first cost and said second cost the overlap cost to produce a net cost; and wherein said third means displays on said display said net cost.

9. A communications network for communicating vehicular information and repair estimates, comprising:

a communications channel;

at least one claim terminal, operatively coupled to said communications channel, for sending assignment data through said communication channel, the at least one claim terminal comprising:

a display;

a memory for storing digital data for a multiplicity of vehicles, said digital data including a data base of a plurality of groups of parts and a plurality of associated parts graphics images;

means for inputting vehicle-identification data of a damaged vehicle to said at least one claim terminal;

first means responsive to the vehicle-identification data for displaying, on said display, a list of groups of parts for said damaged vehicle;

second means responsive to selecting a first group of parts from said list of groups of parts for displaying, on said display, a parts description from said data base of the first group of parts;

graphics means responsive to selecting a first part from the parts description for retrieving from said memory a first parts graphics image, stored in digital form and associated with said first part, said graphics means for loading said first parts graphics image into a first memory buffer, said graphics means for generating, in digital form, a first magnified graphics image from said first parts graphics image, and said graphics means for loading said first magnified graphics image into a second memory buffer;

third means responsive to loading said first parts graphics image into said first memory buffer for displaying, on said display, said first parts graphics image; and fourth means responsive to selecting said first magnified graphics image for swapping said first magnified graphics image from said second memory buffer with said first parts graphics image on said display, and displaying said first magnified graphics image; and at least one body shop terminal, operatively coupled to said at least one claim terminal through said communications channel, responsive to assignment data from said at least one claim terminal, for sending a cost estimate to one of said at least one claim terminal, the at least one body shop terminal comprising:

a display;

a memory for storing digital data for a multiplicity of vehicles, said digital data including a data base of a plurality of groups of parts and a plurality of associated parts graphics images;

means for inputting vehicle-identification data of said damaged vehicle to said body shop terminal;

first means responsive to the vehicle-identification data for displaying, on said display, a list of groups of parts for said damaged vehicle;

second means responsive to selecting a first group of parts from said list of groups of parts for displaying, on said display, a parts description from said data base of the first group of parts;

graphics means responsive to selecting a first part from the parts description for retrieving from said memory a first parts graphics image, stored in digital form and associated with said first part, said graphics means for loading said first parts graphics image into a first memory buffer, said graphics means for generating, in digital form, a first magnified graphics image from said first parts graphics image, and said graphics means for loading said first magnified graphics image into a second memory buffer;

third means responsive to loading said first parts graphics image into said first memory buffer for displaying, on said display, said first parts graphics image; and fourth means responsive to selecting said first magnified graphics image for swapping said first magnified graphics image from said second memory buffer with said first parts graphics image on said display, and displaying said first magnified graphics image.

10. The communications network as set forth in claim 9 further comprising:

at least one vendor terminal, operatively coupled to said at least one body shop terminal, responsive to parts order information received from said at least one body shop terminal, for sending to said at least one body shop terminal a corresponding acknowledgement signal.

11. The communications network as set forth in claim 10 further comprising:

at least one salvage terminal, operatively coupled to said at least one body shop terminal to receive first parts information, for sending information of used parts to said at least one body shop terminal.

12. The communications network as set forth in claim 9 wherein said fourth means of said at least one body shop terminal, responsive to selecting said first parts graphics image, swaps said first parts graphics image with said first magnified graphics image on said display, and displays said first parts graphics image.

13. The communications network as set forth in claim 9 wherein said at least one body shop terminal further include text means, responsive to selecting said first part from said parts description, for retrieving from said memory text information, stored in digital form and associated with said first part; and wherein said third means of said at least one body shop terminal displays, on said display, said text information on top of said parts graphics image.

14. The communications network as set forth in claim 13 wherein said text means of said at least one body shop terminal scrolls a text window over said first parts graphics image.

15. The communications network as set forth in claim 9 further comprising:

imaging means for capturing an electronic image in digital form of said damaged vehicle;

interface means, operatively coupled to said imaging means, operatively coupled to the data port of the at least one claim terminal, for transferring said electronic image from said imaging means through said data port to the memory of the at least one claim terminal;

wherein the assignment data sent from the at least one claim terminal to the body shop terminals includes said electronic image; and wherein a display of the at least one body shop terminal displays said electronic image on the display with said list of groups of parts for said damaged vehicle.

16. The communications network as set forth in claim 9 further comprising:

imaging means for capturing an electronic image in digital form of said damaged vehicle;

interface means, operatively coupled to said imaging means, operatively coupled to the data port of at least one claim terminal, for transferring said electronic image from said imaging means through said data port to the memory of the at least one claim terminal;

wherein the assignment data sent from the at least one claim terminal to the at least one body shop terminal includes said electronic image; and wherein a display of the at least one body shop terminal displays said electronic image on the display with said parts description.

17. The communications network as set forth in claim 9 further comprising:

imaging means for capturing an electronic image in digital form of said damaged vehicle;

interface means, operatively coupled to said imaging means, operatively coupled to the data port of the at least one claim terminal, for transferring said electronic image from said imaging means through said data port to the memory of the at least one claim terminal;

wherein the assignment data sent from the at least one claim terminal to the at least one body shop terminal includes said electronic image; and wherein a display of the at least one body shop terminal displays said electronic image on the display with said first parts graphic image.

18. The communications network as set forth in claim 9, wherein said at least one claim terminal further includes:

cost means responsive to selecting a first part from the parts description for retrieving from said memory a first cost for repairing said first part, said cost means responsive to selecting a second part from the parts description for retrieving from said memory a second cost for repairing said second part;

wherein said cost means responsive to selecting said first part and said second part retrieves from said memory a replacement cost for said first group and compares said replacement cost with a sum of said first cost and said second cost for determining which of said replacement cost and said sum have a lower cost; and wherein said third means displays on said display said lower cost.

19. The communications network as set forth in claim 18, wherein said at least one claim terminal further includes:

overlap means responsive to said first cost and said second cost for determining any overlap cost and subtracting from a sum of said first cost and said second cost the overlap cost to produce a net cost; and wherein said third means displays on said display said net cost.

20. The communications network as set forth in claim 9, wherein said at least one body shop terminal further includes:

cost means responsive to selecting a first part from the parts description for retrieving from said memory a first cost for repairing said first part, said cost means responsive to selecting a second part from the parts description for retrieving from said memory a second cost for repairing said second part;

wherein said cost means responsive to selecting said first part and said second part retrieves from said memory a replacement cost for said first group and compares said replacement cost with a sum of said first cost and said second cost for determining which of said replacement cost and said sum have a lower cost; and wherein said third means displays on said display said lower cost.

21. The communications network as set forth in claim 20, wherein said at least one body shop terminal further includes:

overlap means responsive to said first cost and said second cost for determining any overlap cost and subtracting from a sum of said first cost and said second cost the overlap cost to produce a net cost; and wherein said third means displays on said display said net cost.

22. A method using a communications network including a claim terminal, a body shop terminal, and a communications channel, each of the claim terminal and the body shop terminal having a display and a memory for storing digital data including a parts graphics image, comprising the steps of:

inputting vehicle-identification data of a damaged vehicle into the claim terminal;

sending the vehicle-identification data from the claim terminal through the communications channel to the body shop terminal;

displaying, on the body shop terminal, a list of groups of parts for the damaged vehicle;

selecting from the list of groups of parts a first group of parts for display;

displaying, on the display of the body shop terminal, the first group of parts;

selecting from the first group of parts a first part for display;

retrieving from the memory of the body shop terminal, in response to selecting the first part, a first cost for repairing the first part;

loading, in response to selecting the first part, the parts graphics image into a first memory buffer;

generating from the parts graphics image a magnified graphics image in digital form;

loading the magnified graphics image into a second memory buffer;

displaying, from the first memory buffer onto the display, the parts graphics image;

selecting the magnified graphics image for display;

swapping the magnified graphics image, from the second memory buffer onto the display of the body shop terminal, with the parts graphics image;

selecting from the first group of parts a second part for display;

retrieving from the memory of the body shop terminal, in response to selecting the second part, a second cost for repairing the second part;

loading, in response to selecting the second part, the parts graphics image into the first memory buffer;

generating from the parts graphics image a magnified graphics image in digital form;

loading the magnified graphics image into the second memory buffer;

displaying, from the first memory buffer onto the display of the body shop terminal, the parts graphics image;

selecting the magnified graphics image for display;

swapping the magnified graphics image, from the second memory buffer onto the display, with the parts graphics image;

computing a sum of the first cost and the second cost;

retrieving from the memory means of the body shop terminal a replacement cost for the first group;

determining a lower cost of the replacement cost and the sum;

displaying the lower cost on the display of the body shop terminal; and sending the lower cost as an estimate from the body shop terminal through the communications channel to the claim terminal.

23. The method as set forth in claim 22 further comprising, using the body shop of:

retrieving from the memory of the body shop terminal text information, stored in digital form and associated with the first part; and displaying onto the display of the body shop terminal the text information on top of the parts graphics image.

24. The method as set forth in claim 23 further comprising the step of:

scrolling a text window over the parts graphics image.

25. The method as set forth in claim 22 further comprising the steps of:

capturing with imaging means, coupled to the claim terminal, an electronic image in digital form of the damaged vehicle;

transferring the electronic image from the imaging means to the memory of the claim terminal;

sending assignment data, including the electronic image and the vehicle-identification data, from the claim terminal through the communications channel to the body shop terminal; and displaying the electronic image on the display of the body shop terminal with the list of groups of parts for the damaged vehicle.

26. The method as set forth in claim 25 further comprising the step of:

sending parts order information from the body shop terminal through the communications channel to a vendor terminal.

27. The method as set forth in claim 26 further comprising the step of:

sending graphics images from the body shop terminal through the communications channel to the vendor terminal.

28. The method as set forth in claim 26 further comprising the step of:

sending from the vendor terminal an acknowledgement signal through the communications channel to the body shop in response to the sending of parts order information from the body shop.

29. The method as set forth in claim 26 further comprising the step of:

sending from the vendor terminal a back order parts invoice through the communications channel to the body shop in response to the sending of parts order information from the body shop.

30. The method as set forth in claim 26 further comprising the steps of:

sending first parts information from the body shop terminal through the communications channel to a salvage terminal; and sending used parts information from the salvage terminal through the communications channel to the body shop terminal.

31. The method as set forth in claim 22 further comprising the steps of:

capturing with imaging means, coupled to the claim terminal, an electronic image in digital form of the damaged vehicle;

transferring the electronic image from the imaging means to the memory of the claim terminal;

sending assignment data, including the electronic image and the vehicle-identification data, from the claim terminal through the communications channel to the body shop terminal; and displaying the electronic image on the display of the body shop terminal with the first group of parts.

32. The method as set forth in claim 22 further comprising the steps of:

capturing with imaging means, coupled to the claim terminal, an electronic image in digital form of the damaged vehicle;

transferring the electronic image from the imaging means to the memory of the claim terminal;

sending assignment data, including the electronic image and the vehicle-identification data, from the claim terminal through the communications channel to the body shop terminal; and displaying the electronic image on the display of the body shop terminal with the selected first part.

33. A communications network for communicating insurance claim information and repair estimates for a damaged object, said communications network comprising:

a communications channel;

imaging means for capturing an electronic image in digital form of the damaged object;

a claim terminal, operatively coupled to said imaging means, operatively coupled to said communications channel, for sending assignment data, including customer information, object information, damage information, and the electronic image, through said communications channel, the claim terminal comprising:

a display;

a data port;

a memory for storing digital data for a multiplicity of objects, said digital data including a data base of a plurality of groups of parts and a plurality of associated parts graphics images;

means for inputting object-identification data of said damaged object to said claim terminal;

first means responsive to the object-identification data for displaying, on said display, said electronic image and a list of groups of parts for said damaged object;

second means responsive to selecting a first group of parts from said list of groups of parts for displaying, on said display, said electronic image and a parts description from said data base of the first group of parts;

graphics means responsive to selecting a first part from the parts description for retrieving from said memory a first parts graphics image, stored in digital form and associated with said first part, said graphics means for loading said first parts graphics image into a first memory buffer, said graphics means for generating, in digital form, a first magnified graphics image from said first parts graphics image, and said graphics means for loading said first magnified graphics image into a second memory buffer;

third means responsive to loading said first parts graphics image into said first memory buffer for displaying, on said display, said electronic image and said first parts graphics image; and fourth means responsive to selecting said first magnified graphics image for swapping said first magnified graphics image from said second memory buffer with said first parts graphics image on said display, and displaying said electronic image with said first magnified graphics image;

interface means, operatively coupled to said imaging means, operatively coupled to said data port of said claim terminal, for transferring said electronic image from said imaging means through said data port to said memory means of said claim terminal;

a repair terminal, operatively coupled to said claim terminal through said communications channel, responsive to assignment data from said claim terminal, for sending a cost estimate and a supplemental estimate through said communications channel to said claim terminal, for sending first parts information, parts order information, and parts graphics images through said communications channel, the repair terminal comprising:

a display;

a data port;

a memory for storing digital data for a multiplicity of objects, said digital data including a data base of a plurality of groups of parts and a plurality of associated parts graphics images;

means for inputting object-identification data of said damaged object to said repair terminal;

first means responsive to the object-identification data for displaying, on said display, said electronic image and a list of groups of parts for said damaged object;

second means responsive to selecting a first group of parts from said list of groups of parts for displaying, on said display, said electronic image and a parts description from said data base of the first group of parts;

graphics means responsive to selecting a first part from the parts description for retrieving from said memory a first parts graphics image, stored in digital form and associated with said first part, said graphics means for loading said first parts graphics image into a first memory buffer, said graphics means for generating, in digital form, a first magnified graphics image from said first parts graphics image, and said graphics means for loading said first magnified graphics image into a second memory buffer;

third means responsive to loading said first parts graphics image into said first memory buffer for displaying, on said display, said electronic image and said first parts graphics image; and fourth means responsive to selecting said first magnified graphics image for swapping said first magnified graphics image from said second memory buffer with said first parts graphics image on said display, and displaying said electronic image with said first magnified graphics image; and a supplier terminal, operatively coupled to said repair terminal through said communications channel, responsive to said parts graphics images and said parts order information from said repair terminal, for sending to said repair terminal an acknowledgement signal and back order parts invoice information.

34. The communications network as set forth in claim 33 wherein said fourth means of said repair terminal, responsive to selecting said first parts graphics image, swaps said first parts graphics image with said first magnified graphics image on said display, and displays said first parts graphics image.

35. The communications network as set forth in claim 33 wherein said repair terminal further includes text means, responsive to selecting said first part from said parts description, for retrieving from said memory text information, stored in digital form and associated with said first part; and wherein said third means of said repair terminal displays, on said display, said text information on top of said parts graphics image.

36. The communications network as set forth in claim 35 wherein said text means of said repair terminal scrolls a text window over said first parts graphics image.

37. The communications network as set forth in claim 33, wherein said claim terminal further includes:

cost means responsive to selecting a first part from the parts description for retrieving from said memory a first cost for repairing said first part, said cost means responsive to selecting a second part from the parts description for retrieving from said memory a second cost for repairing said second part;

wherein said cost means responsive to selecting said first part and said second part retrieves from said memory a replacement cost for said first group and compares said replacement cost with a sum of said first cost and said second cost for determining which of said replacement cost and said sum have a lower cost; and wherein said third means displays on said display said lower cost.

38. The communications network as set forth in claim 37, wherein said claim terminal further includes:

overlap means responsive to said first cost and said second cost for determining any overlap cost and subtracting from a sum of said first cost and said second cost the overlap cost to produce a net cost; and wherein said third means displays on said display said net cost.

39. The communications network as set forth in claim 33, wherein said repair terminal further includes:

cost means responsive to selecting a first part from the parts description for retrieving from said memory a first cost for repairing said first part, said cost means responsive to selecting a second part from the parts description for retrieving from said memory a second cost for repairing said second part;

wherein said cost means responsive to selecting said first part and said second part retrieves from said memory a replacement cost for said first group and compares said replacement cost with a sum of said first cost and said second cost for determining which of said replacement cost and said sum have a lower cost; and wherein said third means displays on said display said lower cost.

40. The communications network as set forth in claim 39, wherein said repair terminal further includes:

overlap means responsive to said first cost and said second cost for determining any overlap cost and subtracting from a sum of said first cost and said second cost the overlap cost to produce a net cost; and wherein said third means displays on said display said net cost.

41. A communications network for communicating object information and repair estimates, comprising:

a communications channel;

at least one claim terminal, operatively coupled to said communications channel, for sending assignment data, through said communications channel, the at least one claim terminal comprising:

a display;

a memory for storing digital data for a multiplicity of objects, said digital data including a data base of a plurality of groups of parts and a plurality of associated parts graphics images;

means for inputting object-identification data of a damaged object to said claim terminal;

first means responsive to the object-identification data for displaying, on said display, a list of groups of parts for said damaged object;

second means responsive to selecting a first group of parts from said list of groups of parts for displaying, on said display, a parts description from said data base of the first group of parts;

graphics means responsive to selecting a first part from the parts description for retrieving from said memory a first parts graphics image, stored in digital form and associated with said first part, said graphics means for loading said first parts graphics image into a first memory buffer, said graphics means for generating, in digital form, a first magnified graphics image from said first parts graphics image, and said graphics means for loading said first magnified graphics image into a second memory buffer;

third means responsive to loading said first parts graphics image into said first memory buffer for displaying, on said display, said first parts graphics image; and fourth means responsive to selecting said first magnified graphics image for swapping said first magnified graphics image from said second memory buffer with said first parts graphics image on said display, and displaying said first magnified graphics image; and at least one repair terminal, operatively coupled to said at least one claim terminal through said communications channel, responsive to assignment data from said at least one claim terminal, for sending a cost estimate to one of said at least one claim terminal, the at least one repair terminal comprising:

a display;

a memory for storing digital data for a multiplicity of objects, said digital data including a data base of a plurality of groups of parts and a plurality of associated parts graphics images;

means for inputting object-identification data of said damaged object to said repair terminal;

first means responsive to the object-identification data for displaying, on said display, a list of groups of parts for said damaged object;

second means responsive to selecting a first group of parts from said list of groups of parts for displaying, on said display, a parts description from said data base of the first group of parts;

graphics means responsive to selecting a first part from the parts description for retrieving from said memory a first parts graphics image, stored in digital form and associated with said first part, said graphics means for loading said first parts graphics image into a first memory buffer, said graphics means for generating, in digital form, a first magnified graphics image from said first parts graphics image, and said graphics means for loading said first magnified graphics image into a second memory buffer;

third means responsive to loading said first parts graphics image into said first memory buffer for displaying, on said display, said first parts graphics image; and fourth means responsive to selecting said first magnified graphics image for swapping said first magnified graphics image from said second memory buffer with said first parts graphics image on said display, and displaying said first magnified graphics image.

42. The communications network as set forth in claim 41 further comprising:

at least one supplier terminal, operatively coupled to said at least one repair terminal, responsive to parts order information received from said at least one repair terminal, for sending to said at least one repair terminal a corresponding acknowledgement signal.

43. The communications network as set forth in claim 42 further comprising:

at least one salvage terminal, operatively coupled to said at least one repair terminal, to receive first parts information, for sending information of used parts to said at least one repair terminal.

44. The communications network as set forth in claim 41 wherein said fourth means of said at least one repair terminal, responsive to selecting said first parts graphics image, swaps said first parts graphics image with said first magnified graphics image on said display, and displays said first parts graphics image.

45. The communications network as set forth in claim 41 wherein said at least one repair terminal further includes text means, responsive to selecting said first part from said parts description, for retrieving from said memory text information, stored in digital form and associated with said first part; and wherein said third means of said at least one repair terminal displays, on said display, said text information on top of said parts graphics image.

46. The communications network as set forth in claim 45 wherein said text means of said at least one repair terminal scrolls a text window over said first parts graphics image.

47. The communications network as set forth in claim 41 further comprising:

imaging means for capturing an electronic image in digital form of said damaged object;

interface means, operatively coupled to said imaging means, operatively coupled to the data port of the at least one claim terminal, for transferring said electronic image from said imaging means through said data port to the memory of the at least one claim terminal;

wherein the assignment data sent from the at least one claim terminal to the at least one repair terminal includes said electronic image; and wherein a display of the at least one repair terminal displays said electronic image on the display with said list of groups of parts for said damaged object.

48. The communications network as set forth in claim 41 further comprising:

a data port operatively coupled to the at least one claim terminal;

imaging means for capturing an electronic image in digital form of said damaged object;

interface means, operatively coupled to said imaging means, operatively coupled to the data port of the at least one claim terminal, for transferring said electronic image from said imaging means through said data port to the memory of the at least one claim terminal;

wherein the assignment data sent from the at least one claim terminal to the repair terminals includes said electronic image; and wherein a display of the at least one repair terminal displays said electronic image on the display with said parts description.

49. The communications network as set forth in claim 41 further comprising:

a data port operatively coupled to the at least one claim terminal;

imaging means for capturing an electronic image in digital form of said damaged object;

interface means, operatively coupled to said imaging means, operatively coupled to the data port of the at least one claim terminal, for transferring said electronic image from said imaging means through said data port to the memory of the at least one claim terminal;

wherein the assignment data sent from the at least one claim terminal to the repair terminals includes said electronic image; and wherein a display of the at least one repair terminal displays said electronic image on the display with said first parts graphic image.

50. The communications network as set forth in claim 41, wherein said at least one claim terminal further includes:

cost means responsive to selecting a first part from the parts description for retrieving from said memory a first cost for repairing said first part, said cost means responsive to selecting a second part from the parts description for retrieving from said memory a second cost for repairing said second part;

wherein said cost means responsive to selecting said first part and said second part retrieves from said memory a replacement cost for said first group and compares said replacement cost with a sum of said first cost and said second cost for determining which of said replacement cost and said sum have a lower cost; and wherein said third means displays on said display said lower cost.

51. The communications network as set forth in claim 50, wherein said at least one claim terminal further includes:

overlap means responsive to said first cost and said second cost for determining any overlap cost and subtracting from a sum of said first cost and said second cost the overlap cost to produce a net cost; and wherein said third means displays on said display said net cost.

52. The communications network as set forth in claim 41, wherein said at least one repair terminal further includes:

cost means responsive to selecting a first part from the parts description for retrieving from said memory a first cost for repairing said first part, said cost means responsive to selecting a second part from the parts description for retrieving from said memory a second cost for repairing said second part;

wherein said cost means responsive to selecting said first part and said second part retrieves from said memory a replacement cost for said first group and compares said replacement cost with a sum of said first cost and said second cost for determining which of said replacement cost and said sum have a lower cost; and wherein said third means displays on said display said lower cost.

53. The communications network as set forth in claim 52, wherein said at least one repair terminal further includes:

overlap means responsive to said first cost and said second cost for determining any overlap cost and subtracting from a sum of said first cost and said second cost the overlap cost to produce a net cost; and wherein said third means displays on said display said net cost.

54. A method using a communications network including a claim terminal, a repair terminal, and a communications channel, each of the claim terminal and the repair terminal having a display and a memory for storing digital data including a parts graphics image, comprising the steps of:

inputting object-identification data of a damaged object into the claim terminal;

sending the object-identification data from the claim terminal through the communications channel to the repair terminal;

displaying, on the repair terminal, a list of groups of parts for the damaged object;

selecting from the list of groups of parts a first group of parts for display;

displaying, on the display of the repair terminal, the first group of parts;

selecting from the first group of parts a first part for display;

retrieving from the memory of the repair terminal, in response to selecting the first part, a first cost for repairing the first part;

loading, in response to selecting the first part, the parts graphics image into a first memory buffer;

generating from the parts graphics image a magnified graphics image in digital form;

loading the magnified graphics image into a second memory buffer;

displaying, from the first memory buffer onto the display, the parts graphics image;

selecting the magnified graphics image for display;

swapping the magnified graphics image, from the second memory buffer onto the display of the repair terminal, with the parts graphics image;

selecting from the first group of parts a second part for display;

retrieving from the memory of the repair terminal, in response to selecting the second part, a second cost for repairing the second part;

loading, in response to selecting the second part, the parts graphics image into the first memory buffer;

generating from the parts graphics image a magnified graphics image in digital form;

loading the magnified graphics image into the second memory buffer;

displaying, from the first memory buffer onto the display of the repair terminal, the parts graphics image;

selecting the magnified graphics image for display;

swapping the magnified graphics image, from the second memory buffer onto the display, with the parts graphics image;

computing a sum of the first cost and the second cost;

retrieving from the memory means of the repair terminal a replacement cost for the first group;

determining a lower cost of the replacement cost and the sum;

displaying the lower cost on the display of the repair terminal; and sending the lower cost as an estimate from the repair terminal through the communications channel to the claim terminal.

55. The method as set forth in claim 54 further comprising the steps of:

retrieving from the memory of the repair terminal text information, stored in digital form and associated with the first part; and displaying onto the display of the repair terminal the text information on top of the parts graphics image.

56. The method as set forth in claim 55 further comprising the step of:

scrolling a text window over the parts graphics image.

57. The method as set forth in claim 54 further comprising the steps of:

capturing with imaging means, coupled to the claim terminal, an electronic image in digital form of the damaged object;

transferring the electronic image from the imaging means to the memory of the claim terminal;

sending assignment data, including the electronic image and the object-identification data, from the claim terminal through the communications channel to the repair terminal; and displaying the electronic image on the display of the repair terminal with the list of groups of parts for the damaged object.

58. The method as set forth in claim 57 further comprising the step of:

sending parts order information from the repair terminal through the communications channel to a supplier terminal.

59. The method as set forth in claim 58 further comprising the step of:

sending graphics images from the repair terminal through the communications channel to the supplier terminal.

60. The method as set forth in claim 58 further comprising the step of:

sending from the supplier terminal an acknowledgement signal through the communications channel to a repair location in response to the sending of parts order information from the repair location.

61. The method as set forth in claim 58 further comprising the step of:

sending from the supplier terminal a back order parts invoice through the communications channel to the repair location in response to the sending of parts order information from the repair location.

62. The method as set forth in claim 58 further comprising the steps of:

sending first parts information from the repair terminal through the communications channel to a salvage terminal; and sending used parts information from the salvage terminal through the communications channel to the repair terminal.

63. The method as set forth in claim 54 further comprising the steps of:

capturing with imaging means, coupled to the claim terminal, an electronic image in digital form of the damaged object;

transferring the electronic image from the imaging means to the memory of the claim terminal;

sending assignment data, including the electronic image and the object-identification data, from the claim terminal through the communications channel to the repair terminal; and displaying the electronic image on the display of the repair terminal with the first group of parts.

64. The method as set forth in claim 54 further comprising the steps of:

capturing with imaging means, coupled to the claim terminal, an electronic image in digital form of the damaged object;

transferring the electronic image from the imaging means to the memory of the claim terminal;

sending assignment data, including the electronic image and the object-identification data, from the claim terminal through the communications channel to the repair terminal; and displaying the electronic image on the display of the repair terminal with the selected first part.

* * * * *

UNITED STATES PATENT AND TRADEMARK OFFICE
CERTIFICATE OF CORRECTION

PATENT NO. : 5,504,674
DATED : April 2, 1996
INVENTOR(S) : Jeff P. Chen et al.

It is certified that error appears in the above-indentified patent and that said Letters Patent is hereby corrected as shown below:

In the Claims

In claim 1, column 21, line 29, after "memory" insert --for--.

Col. 24,
In claim 13, line 2, delete "include" and substitute --includes--.

In claim 15, after "comprising:" in line 2, insert the following paragraph: --a data port operatively coupled to the at least one claim terminal;--.

Col. 25,
In claim 16, after "comprising:" in line 2, insert the following paragraph: --a data port operatively coupled to the at least one claim terminal;--.

In claim 17, after "comprising:" in line 2, insert the following paragraph: --a data port operatively coupled to the at least one claim terminal;--.

Col. 27,
In claim 23, line 2, delete ", using the body shop" and substitute --the steps--.

UNITED STATES PATENT AND TRADEMARK OFFICE
CERTIFICATE OF CORRECTION

PATENT NO. : 5,504,674
DATED : April 2, 1996
INVENTOR(S) : Jeff P. Chen et al.

It is certified that error appears in the above-indentified patent and that said Letters Patent is hereby corrected as shown below:

Col. 32,
    In claim 47, after "comprising:" in line 2, insert the following paragraph: --a data port operatively coupled to the at least one claim terminal;--.

Signed and Sealed this

Twenty-second Day of July, 1997

Attest:

Attesting Officer

BRUCE LEHMAN
Commissioner of Patents and Trademarks